US010961413B2

(12) United States Patent
Kim et al.

(10) Patent No.: US 10,961,413 B2
(45) Date of Patent: Mar. 30, 2021

(54) CURABLE POLYSILOXANE COMPOSITIONS AND SLIPPERY MATERIALS AND COATINGS AND ARTICLES MADE THEREFROM

(71) Applicant: Adaptive Surface Technologies, Inc., Cambridge, MA (US)

(72) Inventors: Philseok Kim, Waltham, MA (US); Teluka Pasan Galhenage, Chestnut Hill, MA (US); Joseph Lomakin, Arlington, MA (US)

(73) Assignee: Adaptive Surface Technologies, Inc., Cambridge, MA (US)

( * ) Notice: Subject to any disclaimer, the term of this patent is extended or adjusted under 35 U.S.C. 154(b) by 79 days.

(21) Appl. No.: 15/959,835

(22) Filed: Apr. 23, 2018

(65) Prior Publication Data

US 2018/0327684 A1 Nov. 15, 2018

Related U.S. Application Data

(63) Continuation of application No. PCT/US2017/025889, filed on Apr. 4, 2017.
(Continued)

(51) Int. Cl.
*C07F 5/04* (2006.01)
*C09D 183/04* (2006.01)
(Continued)

(52) U.S. Cl.
CPC .............. *C09D 183/04* (2013.01); *B32B 3/26* (2013.01); *B32B 7/12* (2013.01); *B32B 9/04* (2013.01);
(Continued)

(58) Field of Classification Search
CPC .... C09D 183/04; C09D 5/1675; B32B 27/12; B32B 27/20; B32B 25/10; B32B 27/285;
(Continued)

(56) References Cited

U.S. PATENT DOCUMENTS

| 4,025,693 A | 5/1977 | Milne |
| 4,667,661 A | 5/1987 | Scholz et al. |

(Continued)

FOREIGN PATENT DOCUMENTS

| DE | 102011006128 A1 | 9/2012 |
| EP | 2492323 A1 | 8/2012 |

(Continued)

OTHER PUBLICATIONS

International Search Report for PCT/US2017/025889 dated July 3, 2017.

*Primary Examiner* — Prem C Singh
*Assistant Examiner* — Francis C Campanell
(74) *Attorney, Agent, or Firm* — Innovators Legal

(57) ABSTRACT

The present teachings generally provide curable polysiloxane compositions including a base resin including a surface active polymer. Articles of manufacture including the curable polysiloxane compositions and slippery coatings and materials also are provided. The compositions may be used to provide slippery, lubricious, or repellent materials and coatings and may provide anti-fouling function. The compositions can provide anti-fouling or foul-release function on open surfaces, internal surfaces, membranes; to provide pinning free or low contact angle hysteresis surfaces; to provide homogeneous interface to suppress nucleation; to provide a barrier layer such as anti-corrosion; to provide anti-stain, anti-smudge, anti-fingerprint, anti-soil function.

30 Claims, 16 Drawing Sheets

Related U.S. Application Data

(60) Provisional application No. 62/318,480, filed on Apr. 5, 2016.

(51) Int. Cl.

| | | |
|---|---|---|
| *C08L 83/08* | (2006.01) | |
| *B32B 27/28* | (2006.01) | |
| *B32B 9/04* | (2006.01) | |
| *C08L 83/04* | (2006.01) | |
| *B32B 25/04* | (2006.01) | |
| *B32B 3/26* | (2006.01) | |
| *B32B 7/12* | (2006.01) | |
| *B32B 27/10* | (2006.01) | |
| *B32B 27/30* | (2006.01) | |
| *B32B 25/06* | (2006.01) | |
| *B32B 25/20* | (2006.01) | |
| *B32B 27/06* | (2006.01) | |
| *B32B 25/10* | (2006.01) | |
| *B32B 27/20* | (2006.01) | |
| *B32B 27/12* | (2006.01) | |
| *C09D 5/16* | (2006.01) | |
| *C08G 77/28* | (2006.01) | |
| *C10M 107/50* | (2006.01) | |
| *C08G 77/16* | (2006.01) | |
| *C10N 50/08* | (2006.01) | |
| *C08G 77/12* | (2006.01) | |
| *C08G 77/20* | (2006.01) | |
| *C08G 77/00* | (2006.01) | |

(52) U.S. Cl.
CPC .............. *B32B 25/04* (2013.01); *B32B 25/06* (2013.01); *B32B 25/10* (2013.01); *B32B 25/20* (2013.01); *B32B 27/06* (2013.01); *B32B 27/10* (2013.01); *B32B 27/12* (2013.01); *B32B 27/20* (2013.01); *B32B 27/283* (2013.01); *B32B 27/285* (2013.01); *B32B 27/30* (2013.01); *C08G 77/28* (2013.01); *C08L 83/04* (2013.01); *C08L 83/08* (2013.01); *C09D 5/1675* (2013.01); *C10M 107/50* (2013.01); *B32B 2250/03* (2013.01); *B32B 2250/04* (2013.01); *B32B 2255/02* (2013.01); *B32B 2255/12* (2013.01); *B32B 2255/26* (2013.01); *B32B 2270/00* (2013.01); *B32B 2307/41* (2013.01); *B32B 2307/412* (2013.01); *B32B 2307/414* (2013.01); *B32B 2307/538* (2013.01); *B32B 2307/714* (2013.01); *B32B 2307/7145* (2013.01); *B32B 2307/728* (2013.01); *B32B 2307/732* (2013.01); *B32B 2307/746* (2013.01); *B32B 2307/752* (2013.01); *B32B 2405/00* (2013.01); *B32B 2419/00* (2013.01); *B32B 2439/00* (2013.01); *B32B 2439/46* (2013.01); *B32B 2457/00* (2013.01); *B32B 2535/00* (2013.01); *B32B 2597/00* (2013.01); *B32B 2605/12* (2013.01); *C08G 77/12* (2013.01); *C08G 77/16* (2013.01); *C08G 77/20* (2013.01); *C08G 77/70* (2013.01); *C10M 2229/0525* (2013.01); *C10N 2050/08* (2013.01)

(58) Field of Classification Search
CPC ......... B32B 27/06; B32B 25/20; B32B 25/06; B32B 27/30; B32B 27/10; B32B 7/12; B32B 3/26; B32B 25/04; B32B 27/283; B32B 9/04; B32B 2307/732; B32B 2307/714; B32B 2307/746; B32B 2597/00; B32B 2439/00; B32B 2457/00; B32B 2270/00; B32B 2255/02; B32B 2439/46; B32B 2307/538; B32B 2255/26; B32B 2605/12; B32B 2535/00; B32B 2307/728; B32B 2255/12; B32B 2307/752; B32B 2307/414; B32B 2250/04; B32B 2307/412; B32B 2307/41; B32B 2250/03; C08L 83/08; C08L 83/04; C10N 2250/08; C10M 2229/0525; C10M 107/50; C08G 77/70; C08G 77/20; C08G 77/12; C08G 77/16; C08G 77/28
USPC .......................................... 508/200; 428/429
See application file for complete search history.

(56) References Cited

U.S. PATENT DOCUMENTS

| | | |
|---|---|---|
| 4,720,521 A | 1/1988 | Spielvogel et al. |
| 2013/0122314 A1 | 5/2013 | Ou |
| 2014/0134146 A1 | 5/2014 | Olsen et al. |
| 2014/0342166 A1 | 11/2014 | Yang et al. |
| 2015/0152270 A1 | 6/2015 | Aisenberg et al. |
| 2016/0244606 A1 | 8/2016 | Ravichandran et al. |

FOREIGN PATENT DOCUMENTS

| | | | |
|---|---|---|---|
| WO | 2008074102 A1 | 6/2008 | |
| WO | 2008132195 A1 | 11/2008 | |
| WO | 2008132196 A1 | 11/2008 | |
| WO | WO-2008132195 A1 * | 11/2008 | ........... C09D 183/04 |
| WO | 2011059462 A1 | 5/2011 | |
| WO | 2013000478 A1 | 1/2013 | |
| WO | 2016196565 A2 | 12/2016 | |

* cited by examiner

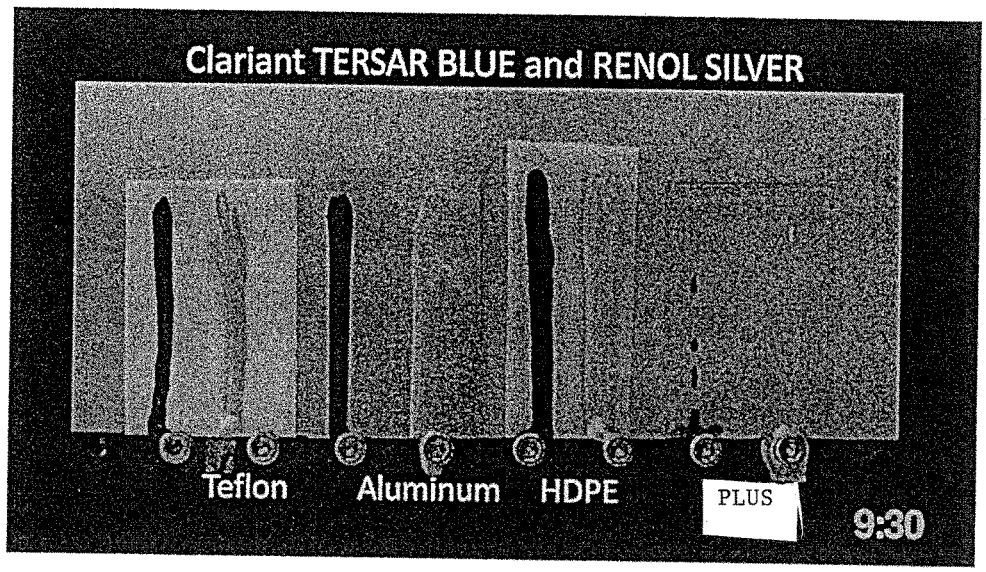
FIG. 11
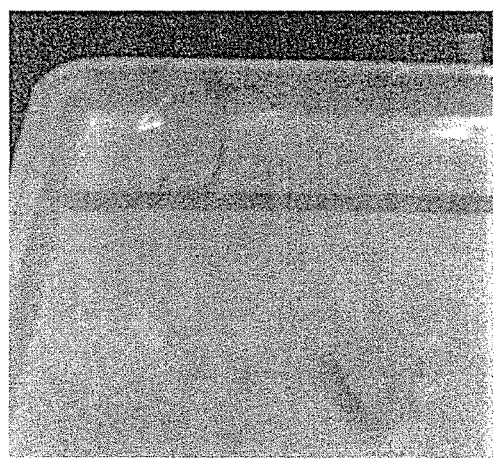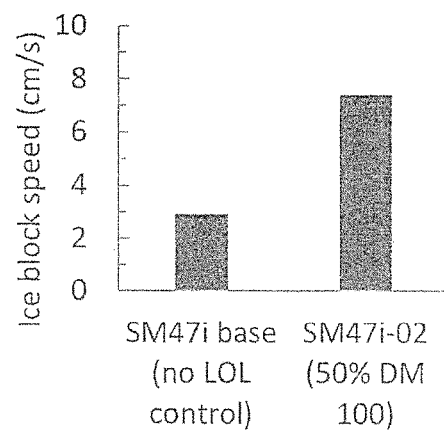
FIG. 12

FIG. 13

| Well | Percent Rounding | Percent Cells Without Intracytoplasmic Granules | Percent Lysis | Grade | Reactivity |
|---|---|---|---|---|---|
| Test (1) | 0 | 0 | 0 | 0 | None |
| Test (2) | 0 | 0 | 0 | 0 | None |
| Test (3) | 0 | 0 | 0 | 0 | None |
| Negative Control (1) | 0 | 0 | 0 | 0 | None |
| Negative Control (2) | 0 | 0 | 0 | 0 | None |
| Negative Control (3) | 0 | 0 | 0 | 0 | None |
| Reagent Control (1) | 0 | 0 | 0 | 0 | None |
| Reagent Control (2) | 0 | 0 | 0 | 0 | None |
| Reagent Control (3) | 0 | 0 | 0 | 0 | None |
| Positive Control (1) | Not Applicable | Not Applicable | 100 | 4 | Severe |
| Positive Control (2) | Not Applicable | Not Applicable | 100 | 4 | Severe |
| Positive Control (3) | Not Applicable | Not Applicable | 100 | 4 | Severe |

Note: 1, 2 and 3 denote replicates.

FIG. 14

Test and Control Direct Contact Sample Result

| Sample | ABS 1 | ABS 2 | ABS 3 | Mean Blank Corrected % Hemolysis | Standard Deviation | Mean Hemoglobin Concentration (mg/mL) | Hemolytic Index† (%) |
|---|---|---|---|---|---|---|---|
| Test Article | 0.003 | 0.004 | 0.006 | 0.06 | 0.1 | 0.01 | 0.0 |
| Negative Control | 0.005 | 0.007 | 0.005 | 0.15 | 0.3 | 0.02 | |
| Positive Control | 0.376 | 0.389 | 0.378 | 98.86 | 1.8 | 1.18 | |
| Blanks | 0.005 | 0.005 | 0.006 | 1.38* | 0.1 | | |

Test and Control Extract Sample Result

| Sample | ABS 1 | ABS 2 | ABS 3 | Mean Blank Corrected % Hemolysis | Standard Deviation | Mean Hemoglobin Concentration (mg/mL) | Hemolytic Index† (%) |
|---|---|---|---|---|---|---|---|
| Test Article | 0.004 | 0.010 | 0.005 | 0.44 | 0.6 | 0.02 | 0.4 |
| Negative Control | 0.003 | 0.004 | 0.004 | 0.00 | 0.0 | 0.01 | |
| Positive Control | 0.361 | 0.381 | 0.424 | 100.88 | 8.5 | 1.20 | |
| Blanks | 0.005 | 0.006 | 0.004 | 1.30* | 0.3 | | |

▨ = Not Applicable

* Mean % Hemolysis

† Hemolytic Index calculated as follows:

Test article mean blank corrected % hemolysis – Negative control mean blank corrected % hemolysis FIG. 29
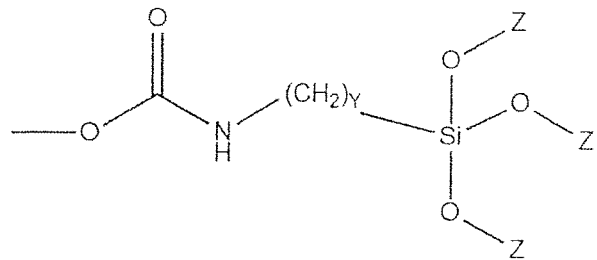
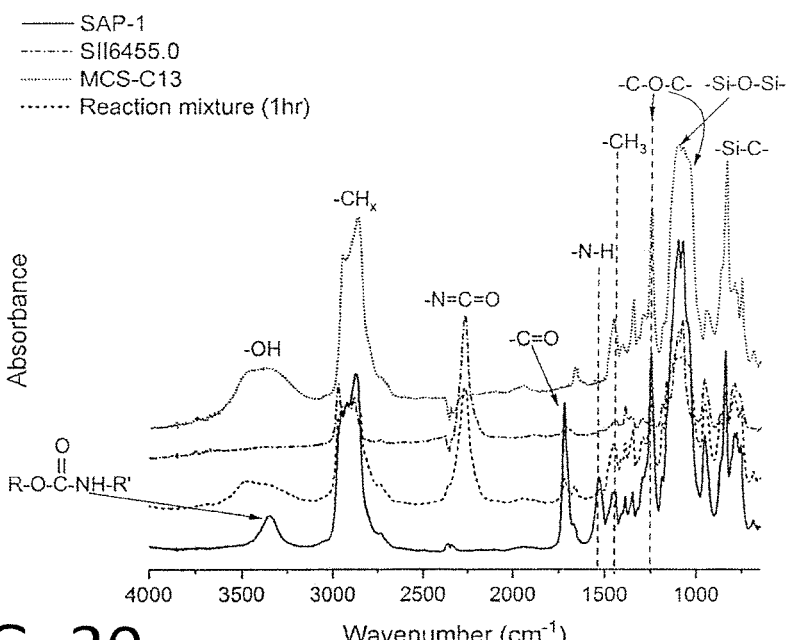
FIG. 30
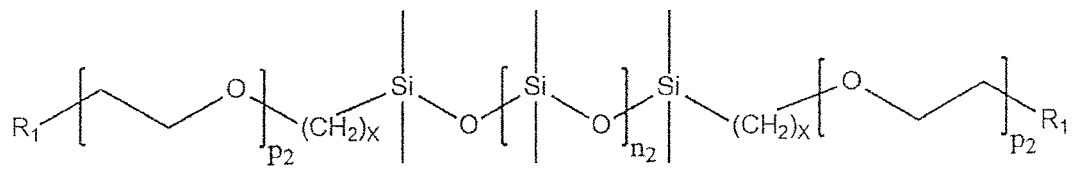
FIG. 31

CURABLE POLYSILOXANE COMPOSITIONS AND SLIPPERY MATERIALS AND COATINGS AND ARTICLES MADE THEREFROM

RELATED APPLICATIONS

This application is a bypass continuation of co-pending International Patent Application PCT/US2017/025889 entitled "CURABLE POLYSILOXANE COMPOSITIONS AND SLIPPERY MATERIALS AND COATINGS AND ARTICLES MADE THEREFROM" having an international filing date of Apr. 4, 2017 and claiming priority under 35 U.S.C. § 119 to U.S. patent application 62/318,480 filed Apr. 5, 2016, the contents of which are incorporated herein by reference in their entirety.

STATEMENT OF GOVERNMENT RIGHTS

This invention was made with government support AR0000759 awarded by the U.S. Department of Energy. The government has certain rights in the invention.

INCORPORATION BY REFERENCE

All patents, patent applications and publications cited herein are hereby incorporated by reference in their entirely in order to more fully describe the state of the art as known to those skilled therein as of the date of the invention described herein.

FIELD

The present invention relates to curable polysiloxane compositions. The present teachings also relate to slippery materials and coatings made therefrom, articles of manufacture incorporating the same, and methods of making and using said compositions, coatings/surfaces and articles.

BACKGROUND

In a variety of applications and industries, it is desirable to have a coating that presents a slippery, non-fouling surface. In such applications, mechanical and optical properties of the coating are also often important.

Previous solutions involve super hydrophobic coatings, hydrophilic coatings, and oil bleeding and smooth low surface energy coatings. However, these solutions typically lack of transparency, and/or insufficient lubricity.

Thus, there is a need to improve coatings presenting a slippery surface, which can be transparent, self-lubricating, and/or non-fouling or anti-fouling.

Further, there is a more particular need regarding growth and accumulation of marine organisms which leads to severe economic and environmental penalties. Anti-fouling paints with biocides are the most abundantly used method to combat biofouling. Anti-fouling paints release organic or inorganic biocides which are toxic to marine organisms. Although majority of state of the art antifouling paints assure no significant toxicity, some ingredients (tri-butyl tin, TBT) used in the past have been shown direct threat to marine life and humans. Silicone based fouling release marine coatings are a non-toxic approach, where fouling organisms adhere weakly and can be easily released due to hydrodynamic shear or pressure. These coatings depend on low surface energy of silicones and fluoropolymers. Given the vast diversity in adhesion preferences of marine organisms, traditional fouling release coatings based on low surface energy coatings discussed in prior arts U.S. Pat. Nos. 2,986,474 A, 3,702,778 A, US20090221752 A1, U.S. Pat. Nos. 6,899,955 B2, and 8,574,719 B2 are deficient in providing broad spectrum resistance to biological fouling in the marine environment. As a result, the fouling release compositions described in prior art have shorter life cycle (decreased performance over time) compared to biocidal antifouling paints. Having a slippery self-lubricating surface based on a thin liquid overlayer has been shown to provide less accumulation of fouling organisms compared to commercial references without a slippery surface based on a liquid overlayer.

SUMMARY

In light of the foregoing, the present invention provides compositions and methods that can address various deficiencies and/or shortcomings of the state-of-the-art, including those outlined above and presents other new improvements in state of the art of fluid repellent management and related materials, articles, methods and systems of making and using the same. That is, the present teachings provide curable polysiloxane compositions that can create slippery coatings and materials using methods described herein. A slippery coating or slippery surface made upon an article can include a cured base resin containing and presenting a lubricating liquid or lubricant overlayer at its outer surface where the base resin and the lubricating liquid have an affinity for each other such that the lubricating liquid can spontaneously cover exposed surfaces of the cured base resin and form an immobilized, stable liquid overlayer over and above the cured base resin surface and within the base resin. The present invention also provides articles of manufacture including the slippery materials and coatings or other article surfaces made from the polysiloxane compositions described herein.

More specifically, the present invention provides curable polysiloxane compositions that upon curing can create a slippery coating, which includes foul-release and foul-impeding ("anti-fouling") properties. A lubricant overlayer (also referred to herein as an "LOL" or a "lubricating liquid overlayer") presented on the surface of a cured curable polysiloxane composition can provide slippery behavior, as indicated by repellency to water (particularly, 15 uL water droplet slides on such surface if tilted at or greater than 15 degree), ice/frost, as well as complex fluids such as cosmetic creams, peanut butter, paints, color master batch, inks, and battery acids. Additionally, the slippery coatings of the present teachings can provide resistance to complex biological fluids such as blood and resistance to attachment by numerous biological organisms such as algae, barnacles, mussels, and bacteria, and fungi without resort solely to components known or leading to indications of toxicity. The precursor mixtures including polysilanes and a matching base resin and matching lubricant can be mixed into one-pot which together, upon curing, forms the slippery materials and coatings or other surfaces as a matrix containing lubricants though the components can be separated into two or more parts for storage and transport purposes to prevent premature reaction/curing.

Thus, in one aspect, the present teachings provide a curable polysiloxane composition that includes a base resin and a lubricating liquid. The base resin can include a compound comprising a vinyl group (a "vinyl-containing compound"); a polysiloxane comprising a silicon hydride group (a "silicon hydride-containing polysiloxane"); a compound containing a polyethyleneglycol group; a compound containing a silane group; and combinations thereof. The base resin can further include a catalyst, such as a platinum or tin catalyst. The vinyl-containing compound can be a perfluorinated hydrocarbon group comprising a vinyl group, a partially fluorinated hydrocarbon group comprising a vinyl group, a silane comprising a vinyl group and/or a polysiloxane comprising a vinyl group. The lubricating liquid, which can be a polysiloxane, a fluorosiloxane, a partially fluorinated polysiloxane and/or a hydrocarbon oil, can be physically and chemically matched with the base resin to spontaneously form a homogeneous curable mixture while providing a stabilized, persisting and self-regenerating overlayer of the lubricating liquid at an exposed surface of the cured polysiloxane composition, i.e., the slippery coating. The property of slippery coating described herein is typically characterized as having a sliding angle of equal or greater than 15 degrees when a 15 uL of water droplet is applied on the said slippery coating. The base resin can alternatively include a silicon hydride group, a silanol group, a polyethylene glycol group, a silane group or combination of any members of said alternative groups and/or vinyl groups with each other. Such groups are related or modified to be matched with polysiloxane and the lubricant to enable condensation reactions but to avoid doing so prematurely.

The curable polysiloxane compositions of the present teachings can be one-pot curable polysiloxane compositions. That is, a base resin can be polymerized and form a polymeric network or matrix while in the presence of a lubricating liquid or lubricant, which can fill the polymeric network or matrix and present an LOL such as a cLOL ("continuous LOL") or a dLOL ("dropwise or discontinuous LOL"). Moreover, the one-pot curable polysiloxane compositions can employ or be derived from fluorinated chemistries.

In providing a curable polysiloxane composition, it should be understood that the composition can be divided or split into separate parts or fractions to prevent premature reaction between the base resin components. More specifically, the vinyl-containing compound can be kept separated from the silicon hydride group-containing polysiloxanes (along with other ingredients in each fraction) until prior to use, when the different fractions or parts can be mixed to form the one-pot curable polysiloxane compositions of the present teachings.

In various embodiments, the chemical functionality of the lubricating liquid is substantially matched with the chemical functionality of backbone chain of the polysiloxanes of the base resin. In some embodiments, the lubricating liquid is matched with the base resin to provide a homogeneous polysiloxane composition prior to curing. In certain embodiments, the polysiloxane composition is transparent. In particular embodiments, the curable polysiloxane composition, for example, the base resin, further includes a pigment, a filler and/or another additive, such as when the curable polysiloxane composition is a paint or a translucent or an opaque coating formulation.

In some embodiments, the vinyl-containing group is a polysiloxane comprising a vinyl group such as a dimethylvinyl-terminated dimethylsiloxane. In certain embodiments, the polysiloxane comprising a silicon hydride group is at least one of a polymethylhydrosiloxane and a methyl hydrosiloxane-dimethylsiloxane co-polymer. In particular embodiments, the polymethylhydrosiloxane or the methyl hydrosiloxane-dimethylsiloxane co-polymer includes terminal trimethylsiloxy groups.

In various aspects of embodiments, the lubricating liquid can be or include at least one of a polydimethylsiloxane derivative such as a silanol-terminated polydimethylsiloxane, a fluorosiloxane, a partially fluorinated polysiloxane, and a hydrocarbon-based oil (hydrocarbon oil). In some embodiments, the lubricating liquid is present in the polysiloxane composition at a weight percentage greater than about 30% of the total weight of the composition. The lubricating liquid can be present in the polysiloxane composition at a weight percentage greater than about 20%, greater than about 25%, greater than about 35%, greater than about 40%, greater than about 45%, greater than about 50%, greater than about 55%, greater than about 60%, or more of the total weight of the composition.

Another aspect is provision of a slippery coating made from a curable polysiloxane composition as described herein. For example, the components of the base resin can form a coating such as a mechanically-stable coating, which coating presents an overlayer of the lubricating liquid at an exposed surface of the cured base resin. In certain embodiments, the slippery coating can be transparent.

In various aspects of embodiments, the overlayer of a slippery coating is continuous over the exposed surface. In some embodiments, the overlayer of the lubricating liquid over the exposed surface of a slippery coating is self-replenishing. For example, the overlayer of lubricating liquid of the slippery coating can be in fluid communication with a reservoir of lubricating liquid, for example, to replenish the lubricating liquid that forms the overlayer. The reservoir would be in addition to a reserve capacity of lubricant within the coating or other host article surface layer.

The slippery coatings on a flat surface can provide a low sliding angle for a foreign object for example, a gas, a liquid, a solid, or combinations thereof. The low sliding angle can be less than about 20°, less than about 15°, less than about 10°, less than about 7°, less than about 5°, less than about 3°, less than about 2°, or less than about 1°. The slippery coatings of the present teachings can provide slippery, lubricious, or repellent materials and coatings against a fluid matter including water, oil, viscous fluids, slurries, complex fluid mixtures with or without solids in them, biological fluids and organisms, bodily fluids, ice, frost, and mixtures thereof; to reduce drag or friction; to enhance product performance by providing slippery feeling, by providing anti-fouling function, by providing application mechanism of payloads such as lubricants, personal care products, drug molecules, and biocides; to provide non-stick or easy-to-clean function; to provide anti-fouling or foul-release function on open surfaces, internal surfaces, membranes; to provide pinning free or low contact angle hysteresis surfaces; to provide a homogeneous interface to suppress nucleation; to provide a barrier layer such as anti-corrosion; to provide anti-stain, anti-smudge, anti-fingerprint, anti-soil function; and to repel insects, spiders, and other pests.

The slippery coatings of the present teachings can be present on a surface of a transparent film, layer or substrate, a translucent or opaque film, layer or substrate, a surface of an optical lens, a surface of a medical device, a surface of a medical material, a surface of a camera, a surface of a marine vessel, a surface of an air foil, a surface of a hydrofoil, a surface of a pipe, a surface of processing equipment, a surface of a cable, a surface of a building, a surface of a shaving razor, a surface of a razor blade, a surface of a consumer product package, an exterior and/or interior surface of a container, a surface of a porous substrate such as paper or fabric, a surface of a membrane or filter, a surface of a component of a microfluidic device, a surface of a component of a molded object, a surface of a component of a 3D printed object, and/or a surface of a component of a 3D printer.

In another aspect, the present teachings provide an article of manufacture including a slippery coating as described herein. For example, a surface of the article of manufacture can include a slippery coating of the present teachings. An article can per se be the slippery surfaced item (e.g. as a membrane film, rod, tube, bag, cone, cap, O-ring or more complex article).

The article of manufacture can be or include an adhesive film product, an optical lens, a medical device, a camera, a marine vessel, a pipe, processing equipment, a cable, a building, a razor, a razor blade, a consumer product package, an exterior and/or interior surface of a container, a porous substrate such as paper or fabric, and/or a component of a 3D printer. In some embodiments, the article of manufacture can include a reservoir of lubricating liquid in fluid communication with the overlayer of lubricating liquid in addition to reserve capacity of lubricant within the coating.

Where the article of manufacture is an adhesive film product, the adhesive film product can include a first release liner adjacent to an adhesive layer, where the adhesive layer is in contact with one side of a substrate film. The substrate film, on its side opposite to the adhesive layer, can include a slippery coating of the present teachings. The substrate film can be transparent, translucent, opaque, and combinations thereof.

An adhesive film product can further include a second release liner, for example, where the second release liner is adjacent to and/or in contact with the slippery coating, opposite of the substrate film. The second release liner can be opposed to the first release liner with respect to the overall adhesive film product.

In another aspect, a method of making a slippery coating is provided. The method generally includes applying a curable polysiloxane composition of the present teachings to a substrate; and curing the polysiloxane composition to form a slippery coating as described herein. The curable polysiloxane composition can be applied by a variety of techniques, including solution depositing techniques such as coating, spraying, rolling, brushing, dip-coating, drop-coating, spin-coating, draw down-coating, transfer printing, relief printing, gravure printing, offset printing, screen printing, simple casting, die slot casting, slit casting, curtain casting, air knife casting, molding, extruding and/or two-dimensional (2D) printing or three-dimensional (3D) printing.

In another aspect, the provided methods include making a slippery coating which presents a slippery liquid overlayer with condensation and addition cure silxoanes that can be hydrophobic, hydrophilic, or amphiphilic. In addition to superior fouling resistance, slippery coatings also reduce water penetration associated with hydrophilic coatings that lack definitive liquid overlayer (LOL).

Regarding marine vessels or other marine structures, amphiphilic surface active polymers (SAP) have gained significant attention over the past few years due to their ability to (a) surface rearrangement, (b) presenting a complex surface energy profile (mixed hydrophobic/hydrophilic surface) and (c) such surface complexity/rearrangement providing unfavorable thermodynamic and kinetic conditions for attachment of adhesive proteins of marine organisms. Recently, a number of novel amphiphilic marine coatings compositions (U.S. Pat. No. 8,450,443 B2, EP2492323 A1, and U.S. Pat. No. 9,169,359 B2) have shown improvement in fouling-release performance compared to traditional polysiloxane based coatings. Self-lubricating slippery coatings with lubricious liquid overlayer (aka. LOL) have shown significant reduction in surface coverage of biological fouling. Although challenging at first, incorporating amphiphilic character to slippery coatings with LOL provides a path to further extend the benefits of amphiphilic surface active polymers and self-lubricating slippery coatings towards combating marine fouling. Coatings with surface active amphiphilic polymers often display increased attraction to water compared to purely hydrophobic coatings. Such compositions are typically prepared using condensation curing approach. One might think incorporating such SAP would compromise slippery characteristics of PLUS coatings. However, the presented compositions have been shown to successfully maintain slippery coatings with definitive LOL (vide infra Unique material properties of reported compositions of matter to see how they are different from conventional compositions that lack liquid overlayer) while using amphiphilic SAPs that exhibit superior fouling-resistant performance compared to traditional polysiloxane-based, purely hydrophobic slippery surfaces.

Initial results from slippery self-lubricating surface have been shown to provide less accumulation of fouling organisms compared to commercial references of similar polysiloxane compositions without a liquid-based slippery surface. The present invention also discusses the incorporation of amphiphilic surface active polymers in a slippery coating that has self-lubricating properties. By doing so, present invention teaches a range of specific compositions of matter that will ensure full curing of the mixture, present amphiphilic wetting character, spontaneous generation of a thin LOL upon curing, and regeneration of LOL after forced removal of LOL. Such new compositions are useful for enhanced fouling release properties.

In another aspect, a method of making a slippery object is provided. The method generally includes casting a curable polysiloxane composition of the present teachings using a mold; and curing the polysiloxane composition to form a slippery object such as tubings, cones, caps, O-rings, membranes and the like as described herein. The curable polysiloxane composition can be cast by a variety of techniques, including molding such as injection molding and extrusion molding, extruding, and/or two-dimensional (2D) or three-dimensional (3D) printing.

The present invention includes according to one aspect thereof self-lubricating slippery liquid overlayer (LOL) coatings through condensation of polysiloxane binder with the presence of matched lubricant. Addition of amphiphilic character to such slippery coatings is also shown in the present invention. Adding the amphiphilic character to slippery self-lubricating coatings may provide a broad spectrum for fouling-release/resistance products. This aspect of the present invention includes compositions and methods of preparing polysiloxane based curable slippery coatings and further incorporating one or more amphiphilic SAPs (surface active polymers) and articles with such coatings surfaces having similar surfaces as in coated articles. The modified coatings exhibit LOL and show reduced accumulation of marine fouling, enhanced water repellency, and low roll-off angle.

The coatings or like surfaces include a binder matrix comprised of one or more polysiloxane having silanol groups (FIG. 1) which can undergo condensation reaction (in the presence of moisture) with hydrolyzable alkoxy, enoxy, oxime, amine, ethoxy, methoxy, or acetoxy silanes. The R groups indicated in silanol structure can be one independent or combination of alkyl C1-C10, aryl C6H5, PEG (polyethylene glycol), PPG (polypropylene glycol), polyalkeylene glycol, PFPE (perfluoropolyether), C2H4-CF3, perfluoro alkyl, or partially fluorinated alkyl groups. Molecular weight of silanol can range from 100-150,000 g/mol. Also, one or more combination of silanols with distinctively different R groups (e.g. mixture of silanol terminated dimethylsiloxane, silanol terminated diethylsiloxane, silanol terminated methylphenylsiloxane, silanol terminated ethylphenyl siloxane, silanol terminated fluoro alkyl, silanol terminated perfluoro alkyl, and silanol terminated PFPE) can be used in the binder. The amphiphilic SAP described in examples below (see, e.g., FIG. 28, and FIG. 29 and related text) can be fully or partially reactive with functional groups of the binder, mainly silanol groups. By doing so the coating matrices comprise amphiphilic character. The unique liquid overlayer (LOL) spontaneously formed and maintained on the surfaces of reported compositions along with amphiphilic character provides the following unique properties shown in Examples 1-32 in the Detailed Description section below.

Lubricants play a vital role in slippery coating described here. A lubricant precisely matched to the coating migrates to the outer surface in a self-replenishing manner. A very thin lubricant overlayer (LOL) is often present on cured compositions. A combination of lubricants (lubricant mixtures) can also be used. Lubricants that can be useful in the present invention include Polydimethylsiloxanes, Trimethylsiloxy Terminated, Carbinol (Hydroxyl) Terminated Polydimethylsiloxanes containing hydroxypropyleneoxypropyl or hydroxyethyleneoxypropyl segments, (Carbinol functional)Methylsiloxane-Dimethylsiloxane Copolymers containing hydroxypropyleneoxypropyl or hydroxyethyleneoxypropyl segments, and MonoCarbinol Terminated polydimethylsiloxanes, aromatic silicones such as DiPhenylsiloxane-DiMethylsiloxane Copolymers, PhenylMethylsiloxane-DiMethylsiloxane Copolymers, and PhenylMethylsiloxane Homopolymers, organic silicones such as AlkylMethylsiloxane Homopolymer, AlkylMethylsiloxane-ArylalkylMethylsiloxane Copolymer, AlkylMethylsiloxane-DiMethylsiloxane Copolymer, PolyDiethylsiloxanes, Triethylsiloxy terminated, Phenyl trimethicone, Caprylyl methicone, and Dodecylmethylsiloxane-2-phenylpropylmethylsiloxane copolymer, fluoro-silicones such as Poly(trifluoropropylmethylsiloxane), poly(trifluoropropylmethylsiloxane dimethylsiloxane) Copolymer, copolymers of polyalkyleneglycol-modified siloxanes and trifluoropropyl group, copolymers of PFFE and polysiloxane, and hydrophilic silicones such as hydroxyalkyl functional Methylsiloxane-Dimethylsiloxane Copolymers, DodecylMethylsiloxane-HydroxypolyalkyleneoxypropylMethylsiloxane, copolymer, and Dimethylsiloxane-(ethylene oxide) block copolymer.

The lubricant used can also have amphiphilic character. Such examples include but not limited to: PEG-dimethylsiloxane copolymer, dimethylsiloxane copolymer, dimethicone copolyol, PEG-8 diemthicone, PEG-10 Dimethicone, PEG-12 Dimethicone, poly(oxy-1,2-ethanediyl), alpha-[3-[1,3,3,3-tetramethyl-1 [{trimethylsily)oxy]disiloxanyl]propyl]omega-hydroxy, bis-PEG-12 dimethicone, polypropylene oxide based silicone polyether, 3-hydroxypropyl methyl siloxane and silicones, dimethylsiloxane-(x % ethylene oxide) block copolymer (x=30-70%), ethoxylated dimethylsiloxane-(x % ethylene oxide) block copolymer (x=30-70%), allyloxy(polyethylene oxide) methyl ether, octamethylcyclotetrasiloxane, carbinol (hydroxyl) terminated polydimethylsiloxane, octamethylcyclotetrasiloxane, (carbinol functional)methylsiloxane-dimethylsiloxane copolymer, (hydroxypropyleneoxypropyl)methylsiloxane-dimethylsiloxane copolymer, monocarbinol terminated polydimethylsiloxane, carbinol terminated polyether siloxane copolymer, PEG/PPG-18/18 dimethicone, (N-pyrrolidonepropyl)methylsiloxane-dimethylsiloxane copolymer, and the combinations thereof.

In another embodiment, the said polysiloxane compositions can contain biocides to enhance the anti-biofouling performance in both static and dynamic conditions. Exemplary biocides include the following: but are not limited to: Cuprous Oxide (Copper (I) Oxide), Copper Thiocyanate (Cuprous Thiocyanate), Copper Pyrithione (Copper Omadine), Zinc Pyrithione (Zinc Omadine), and Econea 028 (Econea, Tralopyril).

Cuprous Oxide (Copper (I) Oxide) has a CAS: 1317-39-1 and a structure: $Cu_2O$ (Crystal). Manufacturer: American Chemet Corporation. Recommended Use: Similar product from Nordox suggests using 20-40 w % in formulations.

Similar product from Nordox include NORDOX CUPROUS OXIDE; PAINT GRADE; XLT-G is a granulated powder, technical grade cuprous oxide, stabilized and free from extraneous impurities. MAIN USE: Active ingredient in antifouling paints with low tint properties. Low density giving softer settling characteristics and increased volume/weight ratio. Low and stable copper leaching rate. Free flowing granulated powder easy to handle. Resilient particles much more resistant to shear than Io-Io tint. CHEMICAL PROPERTIES (ASTM: D283-84 (94): $Cu_2O$ content: min. 93%; Total Cu: min. 82%; Reducing power (RP): min. 93%; Metallic Cu: traces; Cupric Cu: max. 1%; Metals other than Cu: max. 0.5%; Chlorides and sulphates: max. 0.5%; Acetone soluble matter: max. 0.5%; Stability (decrease in RP): max. 1.0% PHYSICAL PROPERTIES; Particle size of $Cu_2O$: d (50)=10-25 µm (Laser diffraction); Oil absorption: max. 20 (ASTM: D 281); Moisture: max. 0.5% loss at 105° C.; Bulk density: 1.1 kg/l (Br. Standard 2955); Packing density: 1.3 kg/l (Br. Standard 2955). BIOLOGICAL PROPERTIES: Antifouling: $Cu_2O$ is the most versatile toxin against fouling organisms; Mammalian toxicity: Non-hazardous.

NORDOX CUPROUS OXIDE, PAINT GRADE, RED, MICRO is a red powder, technical grade cuprous oxide, stabilized and free from extraneous impurities. Meets ASTM Designation D912-81, US Military Specification MIL-P-15169 A, British Admiralty Specification 1150 and French Navy Fascicule G611-Titre 13. MAIN USE Active ingredient in antifouling paints. CHEMICAL PROPERTIES (ASTM: D283-84 (94): $Cu_2O$ content: min. 97%; Total Cu: min. 86%; Reducing power (RP): min. 97%; Metallic Cu: traces; Cupric Cu: max. 1%; Metals other than Cu: max. 0.5%; Chlorides and sulphates: max. 0.5%; Acetone soluble matter: max. 0.5%; Nitric acid insoluble: max. 0.5%; Stability (decrease in RP): max. 1.0%. PHYSICAL PROPERTIES: Particle size of $Cu_2O$: 95% finer than 5 microns, (Br. Standard 3406); 20% finer than 2 microns, (Br. Standard 3406); Wet sieve test: max. 0.01% on 325 mesh (44 microns), (ASTM: D185); Oil absorption: 11 (ASTM: D281); Moisture: max. 0.1% loss at 105° C.; Dispersibility: 25 microns; Bulk density: 1.7 kg/l (Br. Standard 2955); Packing density: 2.7 kg/l (Br. Standard 2955); Specific weight: 5.8 kg/l (ASTM 32, Part II). BIOLOGICAL PROPERTIES: Antifouling: $Cu_2O$ is the most versatile toxin against fouling organisms; Mammalian toxicity: Non-hazardous.

Copper Thiocyanate (Cuprous Thiocyanate): CAS: 1111-67-7; Structure: CuSCN (Crystal). Manufacturer: Bardyke (obtained for in-house from Sigma Aldrich)

Copper Pyrithione (Copper Omadine) (structure depicted below): CAS: 14915-37-8; Manufacturer: Lonza Group Ltd. (Marine Antifouling) (acquired Arch Chemicals); Recommended Use: 2-4% is recommended in the data sheet. Algaecide, Bactericide & Fungicide. Copper Omadine™ Powder AF Antimicrobial, chemical actives: Copper Pyrithione (CPT); CAS No.: 14915 37 8; Physical form: Green Solid; Antimicrobial Activity: Algaecide, Bactericide & Fungicide; Typical Dose Level: 2-4%; Key Performance Benefits: Broad spectrum antimicrobial, Excellent heat and pH stability, No VOCs, Low water solubility=low leach rate=long term protection, extensively tested toxicology and environmental profile. Copper Omadine™ AQ 35 Aqueous Dispersion Antimicrobial, Chemical Actives: Copper Pyrithione (CPT); CAS No. 14915-37-8; Physical Form: Green Paste; Antimicrobial Activity: Algaecide, Bactericide & Fungicide; Typical Dose Level: 5-10%; Key Performance Benefits: Easy to formulate liquid, Active ingredient same as Copper Omadine Powder.

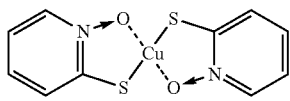

Zinc Pyrithione (Zinc Omadine) (structure depicted below): CAS: 13463-41-7; Manufacturer: Lonza Group Ltd. (Marine Antifouling) (acquired Arch Chemicals). Recommended Use: 4-8% is recommended in the data sheet. Algaecide, Bactericide & Fungicide. Zinc Omadine™ Powder Antimicrobial: Chemical Actives: Zinc Pyrithione (ZPT); CAS No. 13463 41 7; Physical Form: Solid; Antimicrobial Activity: Algaecide, Bactericide & Fungicide; Typical Dose Level: 4-8%; Key Performance Benefits: Easy to formulate liquid

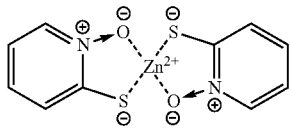

Econea 028 (Econea, Tralopyril) (structure depicted below) CAS: 122454-29-9. Recommended Use: To be added during early stages of manufacturing process alongside pigments and fillers. Can be used in self-polishing copolymer systems and controlled depletion polymer systems. Recommended levels are 4-6 w % (wet) in copper-free coatings, though it can also be used in conjunction with copper. Recommended to use in conjunction with a soft-fouling agent to protect against soft fouling.

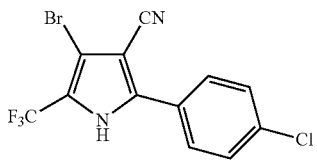 [SMILES: N#Cc1c(-c2ccc(Cl)cc2)[nH]c(C(F)(F)F)c1Br]

Seanine-211 (4,5-dichloro-2-n-octyl-4-isothiazolin-3-one) (structure below). Recommended Use: Contains 1-3% Active ingredient. Recommended use is 3-10% of SeaNine 211 for most applications. Suggests to use in combination with Cuprous Oxide for wide-ranging effects. SEA-NINE™ 211N marine antifouling agent is a rapidly biodegradable settlement inhibitor, developed by The Dow Chemical Company for the new generation of environmentally acceptable marine antifouling paints for ships and marine structures.

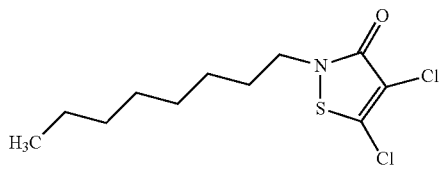 [SMILES: CCCCCCCCn1sc(Cl)c(Cl)c1=O]

Other Miscellaneous Biocides

Irgarol 1051 (BASF, CAS 28159-98-0), Preventol A4 (Lanxess), Preventol A5s or Tolylfluanid (Lanxess, CAS 731-27-1), Zineb or zinc ethane-1,2-diylbis(dithiocarbamate)) (Cerex Agi, CAS 12122-67-7), Diuron (Lanxess), Medetomidine (Selectope, CAS 86347-14-0), and boosters such as zinc oxide.

The foregoing as well as other features and advantages of the present teachings will be more fully understood from the following figures, description, examples, and claims.

BRIEF DESCRIPTION OF DRAWINGS

It should be understood that the drawings described below are for illustration purposes only. Like numerals generally refer to like parts. The drawings are not necessarily to scale, with emphasis generally being placed upon illustrating the principles of the present teachings. The drawings are not intended to limit the scope of the present teachings in any way.

FIG. 11 is a photograph showing a comparison of Clariant master batch blue (left) and silver (right) inks on surfaces of Teflon, aluminum (metal), plastic (HDPE), and a glass slide coated with an embodiment of an anti-fouling coating of the present teachings, where the surfaces are tilted at a 75° angle. (Example 3A).

FIG. 12 is a photograph (left) and a graph (right) showing ice shedding speed on surface with conventional polydimethylsiloxane surface (SM47i base) and an embodiment of an anti-fouling coating of the present teachings, where the surfaces are tilted at a 17° angle. (Left Example 3F, Right example 3A).

FIG. 13 is a table that shows no leachate toxicity of a test article, which has a slippery coating of the present teachings according to Example 3A, in ISO 10993-5 cytotoxicity test. The negative control is a coating according to Example 3F; the reagent control is USP 661 grade high density polyethylene; and the positive control is powder-free latex glove (natural rubber latex). (Example 3A).

FIG. 14 is a table shows direct contact with test article, an anti-fouling coatings of the present teachings, and the test article extract to be non-hemolytic, in ASTM F756 Hemolysis, ISO 10993-4 test. (Example 3A).

FIG. 29 shows one potential formula of R1: silyl ether group linked through a carbamate.

FIG. 30 shows FTIR spectra for starting materials, reaction mixture (after 1 hr) and resulting SAP-1 following complete reaction.

FIG. 31 is a representative structure of amphiphilic surface active polymer 2 (SAP-2 with adjacent PEG groups, ABA type) used for preparing amphiphilic PLUS.

DETAILED DESCRIPTION

It now has been discovered that slippery coatings and materials can be prepared from curable polysiloxane compositions as described herein. The resulting slippery coatings, i.e., cured curable polysiloxane compositions, demonstrate the ability to repel complex fluids such as creams, lotions, peanut butter, battery acids, battery slurries, latex paints, latex dispersions, laundry detergents, fabric softeners, shampoos, conditioners, dish washer soaps, medium to high viscosity liquid color master batches, and various biological fouling species.

Figure 1:
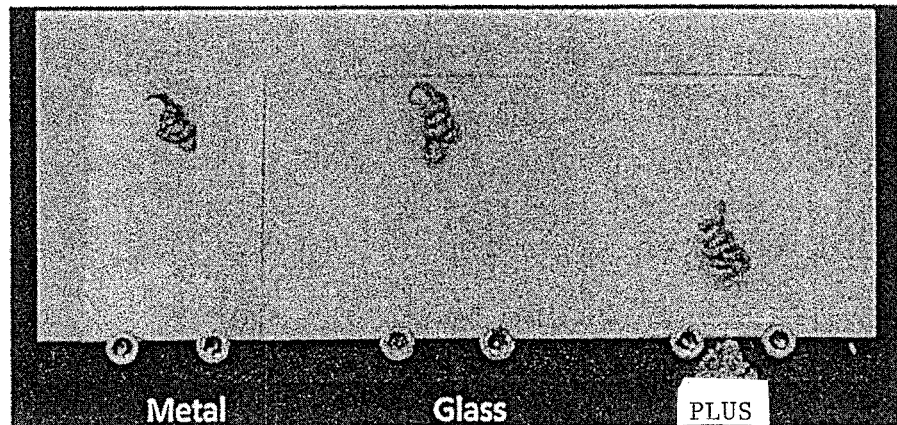
FIG. 1 is a photograph showing a comparison of peanut butter on surfaces of aluminum (metal), glass, and a glass slide coated with an embodiment of an anti-fouling coating of the present teachings, where the surfaces are tilted at a 45° angle. (Example 3A, SM47i-02).
Figure 2:
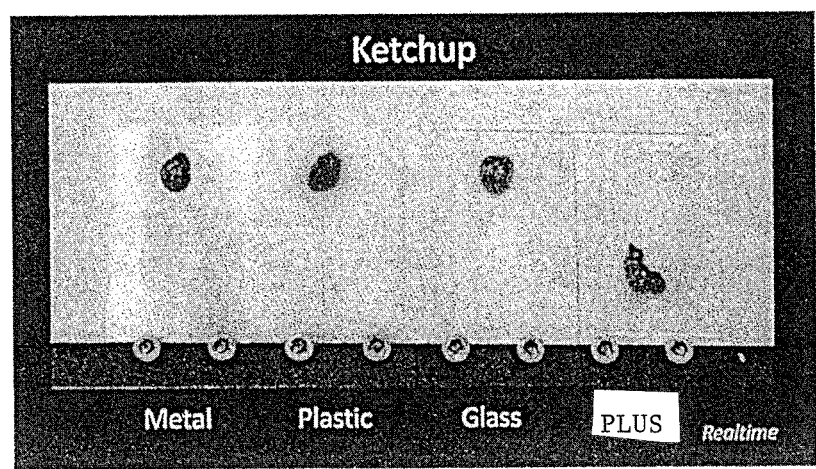
FIG. 2 is a photograph similar to FIG. 1, but for ketchup and including a plastic surface. (Example 3A, SM47i-02).
Figure 3:
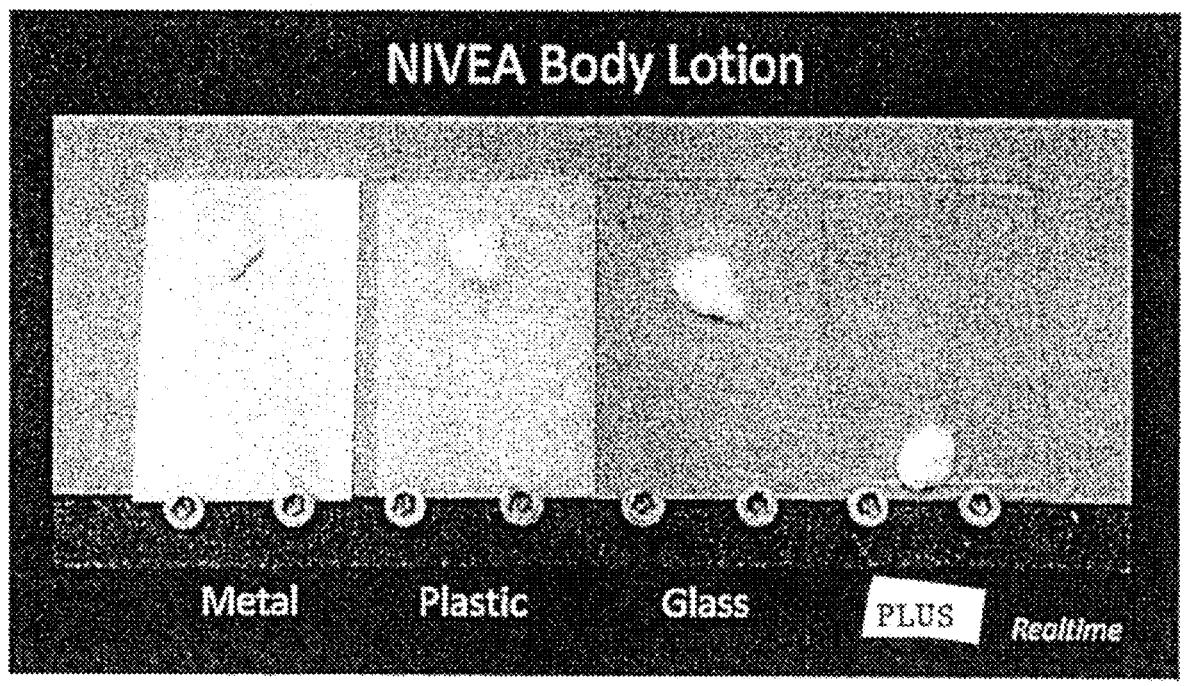
FIG. 3 is a photograph similar to FIG. 2, but for NIVEA body lotion. (Example 3A, SM47i-02).
Figure 10:
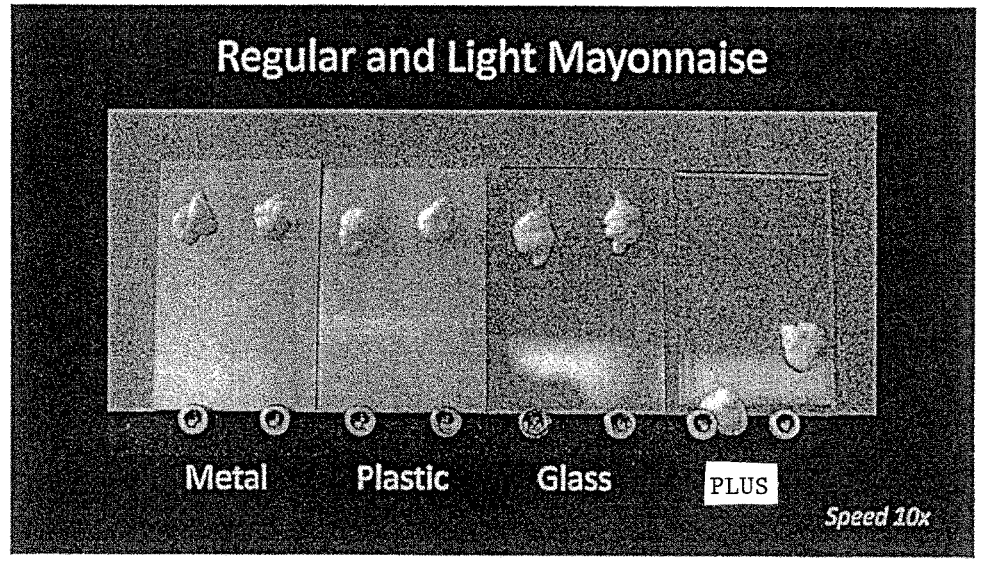
FIG. 10 is a photograph showing a comparison of regular mayonnaise (left) and light mayonnaise (right) on surfaces of aluminum (metal), plastic (HDPE), glass, and a glass slide coated with an embodiment of an anti-fouling coating of the present teachings, where the surfaces are tilted at a 75° angle. (Example 3A).
Figure 15:
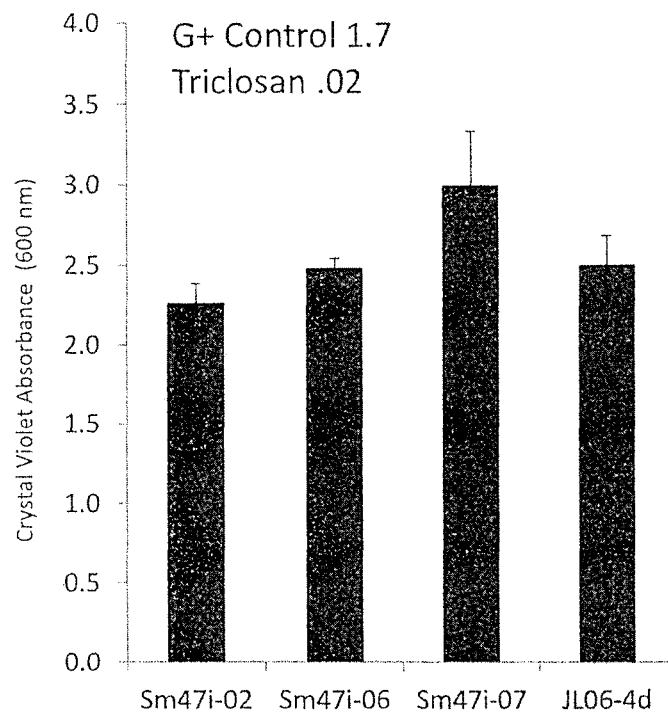
FIG. 15 is a graph showing low leachate toxicity of anti-fouling coatings of the present teachings. (Left to Right, Example 3A, Example 3E, Example 3F, Example 2A).

For example, the slippery coatings can show anti-sticking behavior for a variety of consumer products. As shown in FIG. 1, peanut butter sticks to the aluminum and glass surfaces at a 45° angle, but slides on the slippery coating applied on a glass slide (also at a 45° angle). FIG. 2 shows similar surfaces including plastic, with ketchup as the foreign object. FIG. 3 is similar to FIG. 2 but for NIVEA body lotion. FIG. 10 is similar to FIG. 2, but for mayonnaise.

Figure 8:
FIG. 8 is a photograph showing a comparison of Benjamin Moore red wall paint moving inside an untreated polypropylene container (left), and a container coated with an embodiment of an anti-fouling coating of the present teachings (right), where both containers are turned upside down to simulate evacuation. (Right, Example 3A).

As another example, the slippery coatings of the present teachings can possess anti-fouling properties for handling and improved evacuation of colored fluids. As shown in FIG. 8, commercial paint sticks to polypropylene container, but readily slides on the slippery coating applied to the interior surface of a container. In FIG. 11, commercial color master batches slide on slippery coating which stick to Teflon, metal and plastic surfaces.

As another example, the slippery coatings of the present teachings can possess icephobic properties. As shown in FIG. 12, ice slides rapidly on anti-fouling surface having a slippery coating, while coating containing no silicone oil shows poor ice sliding.

Figure 9:
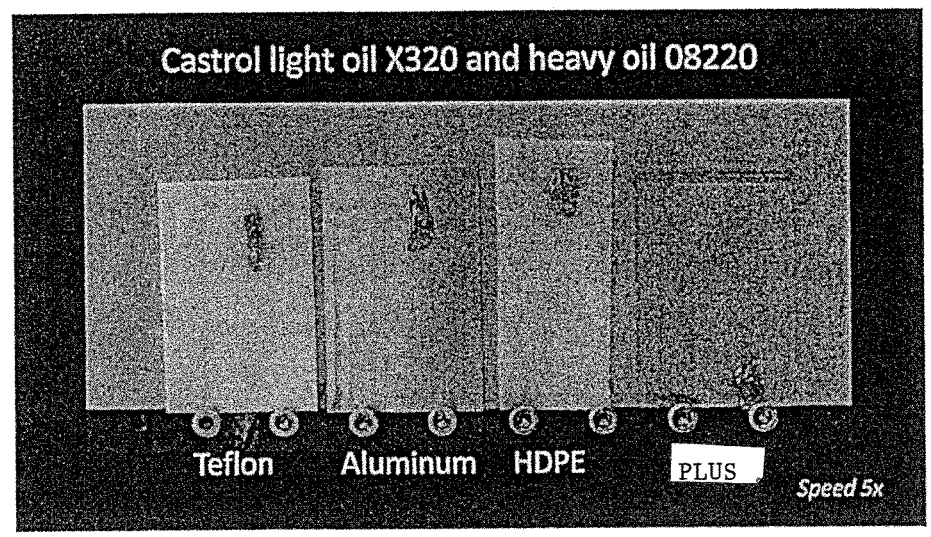
FIG. 9 is a photograph showing a comparison of Castrol light oil X320 (left) and heavy oil (right) on surfaces of Teflon™, aluminum (metal), plastic (HDPE), and a glass slide coated with an embodiment of an anti-fouling coating of the present teachings, where the surfaces are tilted at a 75° angle. (Example 3A).

As another example, the slippery coatings of the present teachings can possess anti-fouling properties in contact with viscous oily substances. As shown in FIG. 9, oils of light or heavy viscosity slide rapidly on anti-fouling surface having a slippery coating, while Teflon™, metal (aluminum) and plastic (HDPE) materials show oil sticking.

Figure 4:
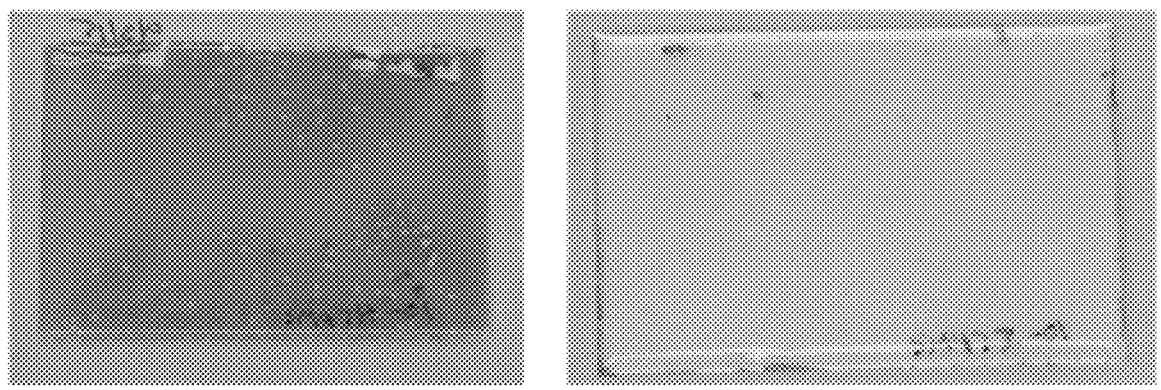
FIG. 4 is a photograph of a glass slide coated with a conventional silicone without any lubricant (left hand side photograph) and a photograph of a glass slide coated with an embodiment of an anti-fouling coating of the present teachings (right hand side photograph). Both coated slides were subjected to and in contact with a biofilm of green algae, *Chlamydomonas reihnhardtii*, which settled on top of coated slides for six days, and showed healthy morphology and proliferation. Upon removal of the coated glass slides from the culture medium, the anti-fouling coating-coated slide showed nearly complete removal of algal biofilm while the other did not. (Right: Example 3F, SM47i-07) Example 3A, SM47i-02).
Figure 5:
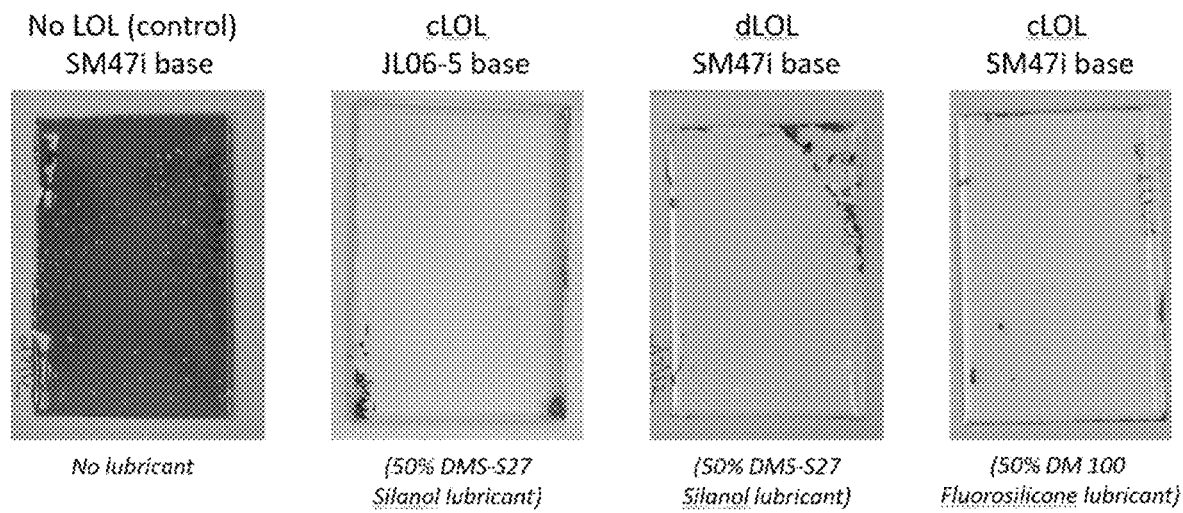
FIG. 5 shows photographs of a glass slide having coated with conventional silicone coating (SM47i base) and glass slides coated with an embodiment of an anti-fouling coating of the present teachings, all of which were exposed to algae. (Left to right, Example 3F, Example 2B, Example 2C, Example 3A).

As another example, the slippery coatings of the present teachings can possess anti-fouling properties for marine applications. As shown in the left hand side photograph in FIG. 4, a silicone formulation containing no silicone oil shows poor algae resistance. The right hand side photograph in FIG. 4 shows an embodiment of a slippery coating of the present teachings, which includes a fluorosiloxane oil as the lubricating liquid. In contrast to the conventional silicone oil, the surface coated with the slippery coating demonstrated good algae resistance.

Figure 22:
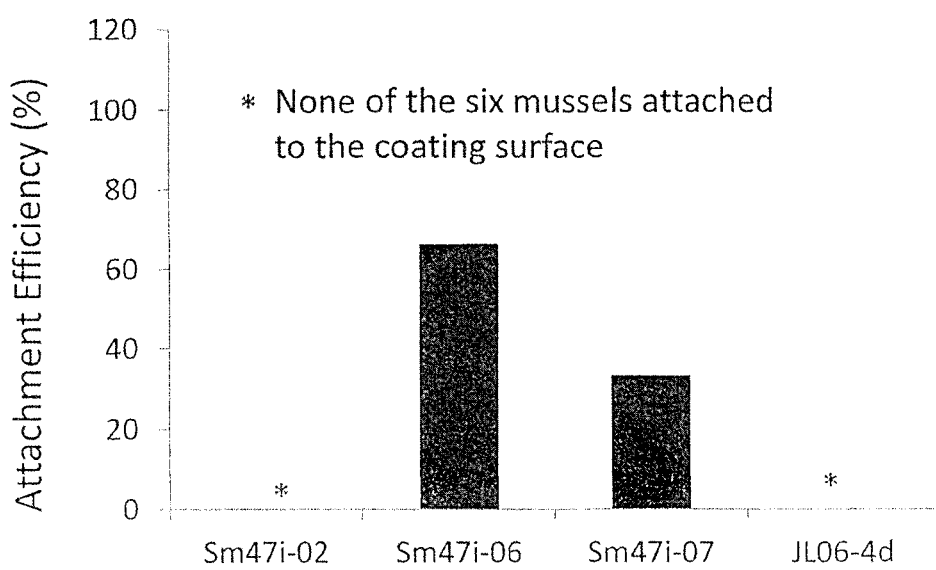
FIG. 22 is a graph showing mussel attachment efficiency of conventional silicone coating (SM47i-07) and embodiments of an anti-fouling coating of the present teachings (SM47i-02, JL06-4). (Left to Right, Example 3A, Example 3E, Example 3F, Example 2A).
Figure 23:
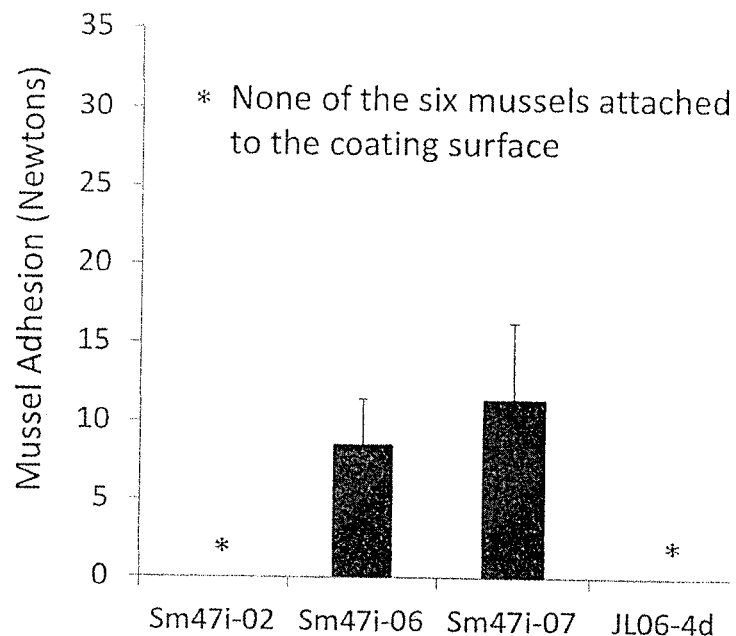
FIG. 23 is a graph showing mussel attachment force of conventional silicone coating (SM47i-07) and embodiments of an anti-fouling coating of the present teachings (SM47i-02, JL06-4). (Left to Right, Example 3A, Example 3E, Example 3F, Example 2A).
Figure 24:
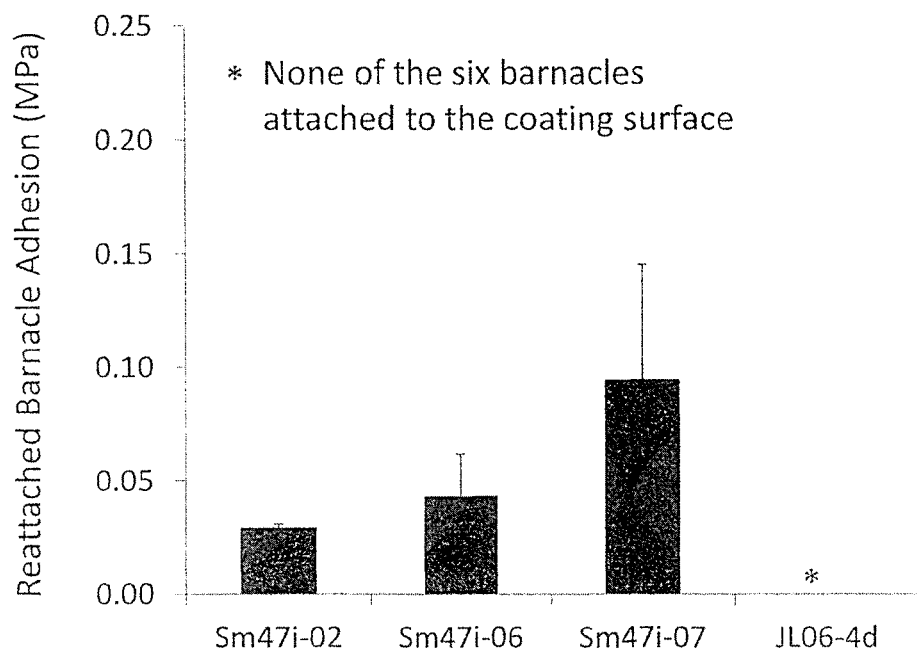
FIG. 24 is a graph showing barnacle attachment force of conventional silicone coating (SM47i-07) and embodiments of an anti-fouling coating of the present teachings (SM47i-02, JL06-4) (Left to Right, Example 3A, Example 3E, Example 3F, Example 2A).

Slippery coating can present reduced attachment of marine organisms such as mussels and barnacles. As shown in FIGS. 22 and 23, mussels are less likely to attach to slippery coatings of the present teachings. FIG. 24 shows that barnacles that attach do so with a reduced force.

Figure 20:
FIG. 20 shows photographs of an uncoated steel panel (left), a panel coated with conventional silicone (middle), and panel coated with an embodiment of an anti-fouling coating of the present teachings (right), after panels have been submerged in ocean harbor in Scituate, Mass. for 6 months. (Middle Dow Corning Sylgard® 184, Right Example 2A).
Figure 21:
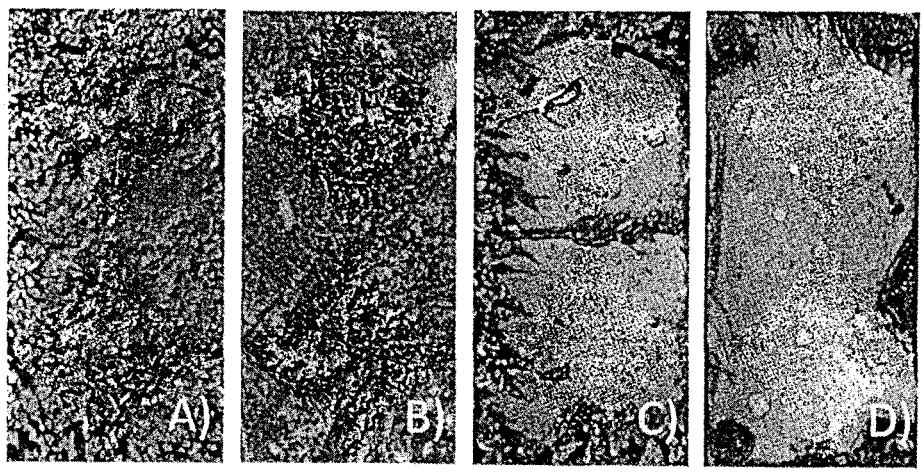
FIG. 21 shows photographs of an panels coated with commercial paint Intersleek 900 (A & B), a panel coated with conventional silicone (middle), and panel coated with an embodiment of an anti-fouling coating of the present teachings (right), after panels have been submerged in ocean harbor in Port Canaveral, Fla. for 6 weeks. (C and D, Example 3A).

Slippery coatings of present teachings can present long lasting resistance to attachment by a diverse range of naturally-occurring marine organisms. As shown in FIG. 20, after 6 months of marine submersion, a slippery coating of the present teachings demonstrates reduced attachment by naturally found marine species (including tunicates, hydroids, and bryozoans). A slippery coating of present teachings can present resistance to attachment of marine organisms in static and in dynamic conditions as shown in FIG. 21.

Figure 25:
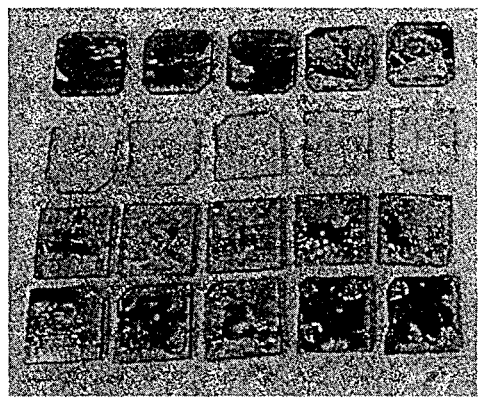
FIG. 25 is a photograph showing *Staphylococcus aureus* attachment as visualized by crystal violet stain to conventional silicone coatings (Sylgard 184, SM47i-07) and embodiments of an anti-fouling coating of the present teachings (SM47i-02, SM47i-06). (Top to bottom Sylgard 184, Example 3A, Example 3E, Example 3F).
Figure 26:
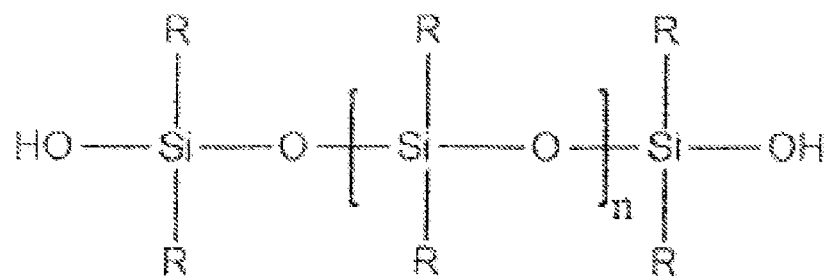
FIG. 26 shows a general formula for silanol terminated polysiloxane used for preparing base matrix of compositions described in the current invention.

Slippery coatings can present anti-bacterial properties. As shown in FIG. 25, Slippery coating of present teachings can reduce adhesion of *Staphylococcus aureus*.

As another example, the slippery coatings of the present teaching can possess broad biocompatibility. As shown in FIG. 13, an embodiment of a slippery coating shows no leachate toxicity in ISO 10993-5 cytotoxicity test. As shown in FIG. 14, an embodiment of a slippery coating is shown to be non-hemolytic either by direct contact or its extractables in accordance with ASTM F756, ISO 10993-4 test. Biocompatibility allows for the slippery coatings to be environmentally benign in marine applications and non-harmful in food, medical and other applications where human contact occurs.

Throughout the application, where compositions are described as having, including, or comprising specific components, or where processes are described as having, including, or comprising specific process steps, it is contemplated that compositions of the present teachings also consist essentially of, or consist of, the recited components, and that the processes of the present teachings also consist essentially of, or consist of, the recited process steps.

In the application, where an element or component is said to be included in and/or selected from a list of recited elements or components, it should be understood that the element or component can be any one of the recited elements or components, or the element or component can be selected from a group consisting of two or more of the recited elements or components.

Further, it should be understood that elements and/or features of a composition, an apparatus, or a method described herein can be combined in a variety of ways without departing from the spirit and scope of the present teachings, whether explicit or implicit herein. For example, where reference is made to a particular structure, that structure can be used in various embodiments of apparatus of the present teachings and/or in methods of the present teachings, unless otherwise understood from the context. In other words, within this application, embodiments have been described and depicted in a way that enables a clear and concise application to be written and drawn, but it is intended and will be appreciated that embodiments may be variously combined or separated without parting from the present teachings and invention(s). For example, it will be appreciated that all features described and depicted herein can be applicable to all aspects of the invention(s) described and depicted herein.

It should be understood that the expression "at least one of" includes individually each of the recited objects after the expression and the various combinations of two or more of the recited objects unless otherwise understood from the context and use. The expression "and/or" in connection with three or more recited objects should be understood to have the same meaning unless otherwise understood from the context.

The use of the term "include," "includes," "including," "have," "has," "having," "contain," "contains," or "containing," including grammatical equivalents thereof, should be understood generally as open-ended and non-limiting, for example, not excluding additional unrecited elements or steps, unless otherwise specifically stated or understood from the context.

The use of the singular herein, for example, "a," "an," and "the," includes the plural (and vice versa) unless specifically stated otherwise.

Where the use of the term "about" is before a quantitative value, the present teachings also include the specific quantitative value itself, unless specifically stated otherwise. As used herein, the term "about" refers to a ±10% variation from the nominal value unless otherwise indicated or inferred.

Where a percentage is provided with respect to an amount of a component or material in a structure or composition, the percentage should be understood to be a percentage based on weight, unless otherwise stated or understood from the context.

Where a molecular weight is provided and not an absolute value, for example, of a polymer, then the molecular weight should be understood to be an average molecule weight, unless otherwise stated or understood from the context.

It should be understood that the order of steps or order for performing certain actions is immaterial so long as the present teachings remain operable. Moreover, two or more steps or actions may be conducted simultaneously.

At various places in the present specification, values are disclosed in groups or in ranges. It is specifically intended that the description include each and every individual subcombination of the members of such groups and ranges and any combination of the various endpoints of such groups or ranges. For example, an integer in the range of 0 to 40 is specifically intended to individually disclose 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, and 40, and an integer in the range of 1 to 20 is specifically intended to individually disclose 1, 2, 3, 4, 5, 6, 7, 8, 9, 10, 11, 12, 13, 14, 15, 16, 17, 18, 19, and 20.

At various places in the present specification, substituents are disclosed in groups or in ranges. It is specifically intended that the description include each and every individual subcombination of the members of such groups and ranges. For example, the term "01-6 alkyl" is specifically intended to individually disclose C1, C2, C3, C4, C5, C6, C1-C6, C1-C5, C1-C4, C1-C3, C1-C2, C2-C6, C2-C5, C2-C4, C2-C3, C3-C6, C3-C5, C3-C4, C4-C6, C4-C5, and C5-C6 alkyl. By way of other examples, an integer in the range of 0 to 40 is specifically intended to individually disclose 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, and 40, and an integer in the range of 1 to 20 is specifically intended to individually disclose 1, 2, 3, 4, 5, 6, 7, 8, 9, 10, 11, 12, 13, 14, 15, 16, 17, 18, 19, and 20. Additional examples include that the phrase "optionally substituted with 1-5 substituents" is specifically intended to individually disclose a chemical group that can include 0, 1, 2, 3, 4, 5, 0-5, 0-4, 0-3, 0-2, 0-1, 1-5, 1-4, 1-3, 1-2, 2-5, 2-4, 2-3, 3-5, 3-4, and 4-5 substituents.

The use of any and all examples, or exemplary language herein, for example, "such as" or "including," is intended merely to illustrate better the present teachings and does not pose a limitation on the scope of the invention unless claimed. No language in the specification should be construed as indicating any non-claimed element as essential to the practice of the present teachings.

The present teachings can provide a curable polysiloxane composition or formulation that includes a vinyl-containing compound, a hydride-containing siloxane, optionally a catalyst, and a matched lubricating liquid such as a silicone, a fluorosilicone or a hydrocarbon oil. Upon being cured, these polysiloxane compositions or formulations can produce mechanically-robust coatings that present a (lubricating) liquid overlayer, which can provide a low sliding angle and a lubricious surface and optionally, transparency, i.e., can be transparent. That is, a slippery coating can be produced where the slippery coating can include a cured base resin containing and presenting a lubricating liquid or lubricant overlayer at its surface where the cured base resin and the lubricating liquid have an affinity for each other such that the lubricating liquid can cover exposed surfaces of the cured base resin and form an immobilized, stable liquid overlayer over and above the cured base resin surface, for example, at a thickness such that only lubricating liquid forms the surface above the base resin (i.e., a liquid interface is presented to the environment). The present teachings also provide the said compositions as a two-part formulation, in which parts can be mixed and then cured to provide slippery coatings.

The present teachings guide the design of such self-generated lubricating surfaces while maintaining maximum mechanical properties. Without wishing to be bound to any particular theory, it is believed that the crosslinked polymer networks should be designed to have maximum chain flexibility which can be achieved by reducing the local number density of crosslinking points and using high molecular weight starting materials. The low linearization energy (or rotational energy barrier) of Si—O backbone (1.26 kJ/mol compared to 13.8 kJ/mol of CH2-CH2 bond) can also facilitate the crosslinked system to undergo segmental motion allowing easy pass-through of the lubricant molecules. However, opening up the network structure too much can negatively impact the overall mechanical properties of the network. This effect can be overcome by introducing non-linear, three-dimensional molecular architecture of the starting materials when designing the crosslinked polymer, such as the use of Q-resins, comb-shaped molecules, brush-like molecules, to further tightly connect the polymeric network.

Mechanically-robust, clear base resin formulations (which can include stoichiometric blends of MQ vinyl siloxanes, hydride siloxanes and catalysts) are described in the art and can be referred to as "base resins." See, e.g., U.S. Patent Application Publication No. 2015/0307759 by Bordoloi et al., which is incorporated by reference herein. MQ siloxanes are microscopic cross-linked networks consisting of a core of three-dimensional Q units (SiO4/2) surrounded by a shell of M units (Me3SiO).

For various base resins, silicone-based lubricating liquids were discovered to contain appropriate system solubility that in combination with components of a base resin can result in homogenous and transparent curable polysiloxane compositions, where the cured solids (coating or material itself) can present a low sliding angle and a lubricious surface. Use of silicone-containing lubricants that contain phenyl- or polypropyleneglycol/polyethyleneglycol (PPG/PEG) containing groups tend to result in heterogeneous formulations and cured compositions that lacked transparency, possibly due to incomplete lubricant compatibility in either liquid or solid state leading to microphase separation. Furthermore, such lubricants often fail to present a complete and continuous lubricant overlayer at its surface, potentially diminishing their anti-fouling performance.

In addition, common silicone fluids, such as methyl-terminated polydimethylsiloxanes or hydroxyl-terminated polydimethylsiloxanes, usually maintain clarity of the compositions but often do not produce a lubricating liquid or lubricant overlayer within a practically meaningful time frame.

Examples of fluorinated (perfluorinated or partially fluorinated) hydrocarbon monomers that can be useful in the present teachings include allyl fluorinated monomers such as Allyl Heptafluorobutyrate, Allyl Heptafluoroisopropyl Ether, Allyl 1H,1H-Pentadecafluorooctyl Ether, Allylpentafluorobenzene, Allyl Perfluoroheptanoate, Allyl Perfluorononanoate, Allyl Perfluorooctanoate, Allyl Tetrafluoroethyl Ether, and Allyl Trifluoroacetate; itaconate and maleate fluorinated monomers such as Hexafluoroisopropyl Itaconate, Bis(Hexafluoroisopropyl) Itaconate, Bis(Hexafluoroisopropyl) Maleate, Bis(Perfluorooctyl)Itaconate, Bis(Perfluorooctyl)Maleate, Bis(Trifluoroethyl) Itaconate, Bis(2,2,2-Trifluoroethyl) Maleate, mono-Perfluorooctyl Maleate, and mono-Perfluorooctyl Itaconate; acrylate and methacrylate (methacrylamide) fluorinated monomers such as 2-(N-Butylperfluorooctanesulfamido) Ethyl Acrylate, 1H,1H,7H-Dodecafluoroheptyl Acrylate, Trihydroperfluoroheptyl Acrylate, 1H,1H,7H-Dodecafluoroheptyl Methacrylate, Trihydroperfluoroheptyl Methacrylate, 1H, 1H, 11H-Eicosafluoroundecyl Acrylate, Trihydroperfluoroundecyl Acrylate, 1H, 1H, 11H-Eicosafluoroundecyl Methacrylate, Trihydroperfluoroundecyl Methacrylate, 2-(N-Ethylperfluorooctanesulfamido)ethyl Acrylate, 2-(N-Ethylperfluorooctanesulfamido)ethyl Methacrylate, 1H, 1H,2H,2H-Heptadecafluorodecyl Acrylate, 1H, 1H,2H,2H-Heptadecafluorodecyl Methacrylate, 1H, 1H-Heptafluorobutylacrylamide, 1H, 1H-Heptafluorobutyl Acrylate, 1H, 1H-Heptafluorobutylmethacrylamide, 1H, 1H-Heptafluoro-n-Butyl Methacrylate, 1H, 1H,9H-Hexadecafluorononyl Acrylate, 1H,1H,9H-Hexadecafluorononyl Methacrylate, 2,2,3,4,4,4-Hexafluorobutyl Acrylate, 2,2,3,4,4,4-Hexafluorobutyl Methacrylate, Hexafluoroisopropyl Acrylate, 1,1,1,3,3,3-Hexafluoroisopropyl Acrylate, 1H,1H, 5H-Octafluoropentyl Acrylate, 1H,1H,5H-Octafluoropentyl Methacrylate, 2,2,3,3,3-Pentafluoropropyl Acrylate, 2,2,3,3,3-Pentafluoropropyl Methacrylate, Perfluorocyclohexyl Methyl Acrylate, Perfluorocyclohexylmethyl Methacrylate, Perfluoroheptoxypoly(Propyloxy) Acrylate, Perfluoroheptoxypoly(Propyloxy) Methacrylate, Perfluorooctyl Acrylate, 1H,1H-Perfluorooctyl Acrylate, 1H,1H-Perfluorooctyl Methacrylate, and Hexafluoroisopropyl Methacrylate; and various other fluorinated monomers such as Pentafluorostyrene, Perfluorocyclopentene, 4-Vinylbenzyl Hexafluoroisopropyl Ether, 4-Vinylbenzyl Perfluorooctanoate, Vinyl Heptafluorobutyrate, Vinyl Perfluoroheptanoate, Vinyl Perfluorononanoate, Vinyl Perfluorooctanoate, Vinyl Trifluoroacetate, Tridecafluoro-1,1,2,2-Tetrahydrooctyl-1,1-Methyl Dimethoxy Silane, Tridecafluoro-1,1,2,2-Tetrahydrooctyl-1-Dimethyl Methoxy Silane, and cinnamate; and the combinations thereof.

Examples of silicone monomers that can be useful in the present teachings include PDMS precursors (e.g., Sylgard® 184), 1,4-Bis[dimethyl[2-(5-norbornen-2-yl)ethyl]silyl]benzene, 1,3-Dicyclohexyl-1,1,3,3-tetrakis(dimethylsilyloxy) disiloxane, 1,3-Dicyclohexyl-1,1,3,3-tetrakis(dimethylvinylsilyloxy)disiloxane, 1,3-Dicyclohexyl-1,1,3,3-tetrakis[(norbornen-2-yl)ethyldimethylsilyloxy]disiloxane, 1,3-Divinyltetramethyldisiloxane, 1,1,3,3,5,5-Hexamethyl-1,5-bis[2-(5-norbornen-2-yl)ethyl]trisiloxane, Silatrane glycol, 1,1,3,3-Tetramethyl-1,3-bis[2-(5-norbornen-2-yl)ethyl]disiloxane, 2,4,6,8-Tetramethyl-2,4,6,8-tetravinylcyclotetrasiloxane, and N-[3-(Trimethoxysilyl)propyl]-N'-(4-vinylbenzyl)ethylenediamine, and the combinations thereof.

Examples of vinyl siloxanes that can be useful in the present teachings include structural variants such as Vinyl terminated, Poly(dimethylsiloxane); Vinylmethylsiloxane-Dimethylsiloxane Copolymers, trimethylsiloxy terminated; Vinylmethylsiloxane Dimethylsiloxane Copolymers, vinyl terminated; Vinyl modified silica Q resin in Poly(dimethylsiloxane); Vinylmethylsiloxane homopolymer linear; Vinylmethylsiloxane homopolymer linear, vinyl terminated; Vinylmethylsiloxane Homopolymer, cyclic; Vinyl T-structure polymers; MonoVinyl Terminated PolyDimethylsiloxanes-asymmetric; MonoVinyl Functional PolyDimethylsiloxane-symmetric; and Allyltrimethoxysilane; and compositional variants such as Vinyl Terminated, Diphenylsiloxane-Dimethylsiloxane Copolymers; Vinyl Terminated Diphenylsiloxane-Dimethylsiloxane Copolymers; Vinyl Terminated polyPhenylMethylsiloxane; VinylPhenylMethyl Terminated VinylPhenylsiloxane-PhenylMethylsiloxane Copolymer; Vinyl Terminated TrifluoropropylMethylsiloxane-Dimethylsiloxane Copolymer; and Vinyl Terminated Diethylsiloxane-Dimethylsiloxane Copolymers; and the combinations thereof.

Examples of silanols that can be useful in the present teachings include silanol terminated Polydimethyl siloxane, Silanol terminated (Vinylmethylsilonae)-Dimethylsiloxane copolymer, Silanol terminated (Diphenylsiloxane)-Dimethylsiloxane copolymer, Silanol terminated Polydiphenylsiloxane, Silanol terminated Polytrifluoroproplymethylsiloxane, and Silanol-Trimethylsilyl modified Q resins; and the combinations thereof.

Examples of hydride siloxanes that can be useful in the present teachings include structural variants such as Hydride Terminated PolyDimethylsiloxanes; MethylHydrosiloxane-Dimethylsiloxane Copolymers, Trimethylsiloxy terminated; MethylHydrosiloxane-Dimethylsiloxane Copolymers, Hydride terminated; polyMethylHydrosiloxanes, Trimethylsiloxy terminated; and Hydride modified silica Q resin in Poly(dimethylsiloxane); and compositional variants such as MethylHydrosiloxane-PhenylMethylsiloxane copolymer, hydride terminated; MethylHydrosiloxane-OctylMethylsiloxane copolymers; and MethylHydrosiloxane-TrifluoropropylMethylsiloxane copolymers; and the combinations thereof.

Examples of lubricating liquids or lubricants that can be useful in the present teachings include Trifluoromethyl C1-4 alkyl dimethicone; Polydimethylsiloxanes, Trimethylsiloxy Terminated; silanols such as Silanol Terminated PolyDimethylsiloxanes; Silanol Terminated Diphenylsiloxane-Dimethylsiloxane Copolymers; Silanol Terminated, Polydiphenylsiloxane; Silanol Terminated PolyTrifluoropropylMethylsiloxane; Carbinol (Hydroxyl) Terminated Polydimethylsiloxanes containing hydroxypropyleneoxypropyl or hydroxyethyleneoxypropyl segments; (Carbinol functional)Methylsiloxane-Dimethylsiloxane Copolymers containing hydroxypropyleneoxypropyl or hydroxyethyleneoxypropyl segments; and MonoCarbinol Terminated polydimethylsiloxanes; aromatic silicones such as DiPhenylsiloxane-DiMethylsiloxane Copolymers, PhenylMethylsiloxane-DiMethylsiloxane Copolymers, and PhenylMethylsiloxane Homopolymers; organic silicones such as AlkylMethylsiloxane Homopolymer; AlkylMethylsiloxane-ArylalkylMethylsiloxane Copolymer; AlkylMethylsiloxane DiMethylsiloxane Copolymer; PolyDiethylsiloxanes, Triethylsiloxy terminated; Phenyl trimethicone; Caprylyl methicone; and Dodecylmethylsiloxane-2-phenylpropylmethylsiloxane copolymer; fluoro-silicones such as Poly Trifluoropropylmethylsiloxane and fluoropropylmethylsiloxane Dimethylsiloxane Copolymer; hydrophilic silicones such as (Hydroxyalkyl functional) Methylsiloxane-Dimethylsiloxane Copolymers and DodecylMethylsiloxane-HydroxypolyalkyleneoxypropylMethylsiloxane, copolymer; and hydrocarbon-based oils or hydrocarbon oils such as saturated hydrocarbon oils, cycloalkanes, unsaturated hydrocarbon oils, branched hydrocarbon oils, aromatic hydrocarbon oils such as naphthalene oil, poly(alphalefins), paraffin oil, petroleum or mineral oil, white mineral oil, isoparaffins (Isopar™), and natural or modified biohydrocarbon oils such as vegetable oil, tocopherol, and pyrolysis oil; and the combinations thereof.

Examples of RTV catalysts that can be useful in the present teachings include Platinum Carbonyl Cyclovinylmethylsiloxane Complex, Platinum-Divinyltetramethyldisiloxane Complex, Platinum-Cyclovinylmethylsiloxane Complex, Platinum-Octanaldehyde/Octanol Complex, and Tris (Dibutylsulfide)Rhodium Trichloride.

Examples of condensation cure catalysts that can be useful in the present teachings include dibutyltin dilaurate (DBTDL), tin(II) octoate, Dibutyltin diacetate, Tin(II) neodecanoate, Dibutyltin diisooctylmaleate, Di-n-butylbutoxychlorotin, Dmethyldineodecane tin, Dimethylhydroxy (oleate) tin, Dibutyl tin(II)-ethylhexanoate, Tin naphthenate, Tin butyrate, Tin oleate, Tin caprylate, Zinc(II)-ethylhexanoate, Zinc naphthenate, Zinc stearate, tetrabutyl titanate, tetrakis(2-ethylhexyl)titanate, triethanolamine titanate, tetra(isopropenyloxy)-titanate, titanium tetrabutanolate, titanium tatrapropanolate; titanium tetraisopropanolate, Zirconium tetrapropanolate, Zirconium tetrabutanolate, diisopropyl bis(acetylacetonyl)titanate. bismuth 2-ethylhexanoate, bismuth octanoate, bismuth neodecanoate, iron 2-ethylhexanoate, lead 2-ethyloctoate, cobalt-2-ethylhexanoate, manganese 2-ethylhexanoate, and the combinations thereof.

Examples of inhibitors that can be useful in the present teachings include 1,3-Divinyltetramethyldisiloxane, 1,3,5,7-Tetravinyl-1,3,5,7-Tetra-Methylcyclotetrasiloxane, allyltriphenylsilane, allyltriisopropylsilane, allytrimethylsilane, and the combinations thereof.

Examples of inhibitors that can be useful in the present teachings include 1,3-Divinyltetramethyldisiloxane and 1,3,5,7-Tetravinyl-1,3,5,7-Tetra-Methylcyclotetrasiloxane allyltriphenylsilane, allyltriisopropylsilane, allytrimethylsilane, and the combinations thereof.

To achieve a transparent, curable polysiloxane composition that presents a lubricious overlayer, the following approach can be utilized. First, a single liquid phase containing a transparent base resin can be formulated or selected from those described in the art. Such a base resin can contain a stoichiometric blend of one or more vinyl-containing compounds such as vinyl siloxanes, hydride siloxanes and optionally, a catalyst, to achieve a fully miscible, non-phase separating, curable clear base formulation, or base resin.

Based on the chemical structure of the base resin, a lubricant can be selected such that the majority of the lubricant's chemical structure matches that of the base resin such as the chemical functionality of the backbone chain of the polysiloxanes of the base resin. For example, for a base resin composed primarily of dimethylsiloxane units, a lubricant can be selected to contain a significant number of dimethylsiloxane units. The suitability of the lubricant can be experimentally confirmed by testing the mutual miscibility of the lubricant and the base resin or by determining solubility parameters. If separation between the lubricant and the base resin is observed, the structure of the lubricant and the base resin can be more closely matched. Closer matching can be achieved by selecting a lubricant that contains a greater fraction of the base resin chemical structural units or by selecting a base resin that more closely matches the structure and the chemical potential of the lubricant.

In addition, the lubricant should be selected to be miscible in the cured polysiloxane composition. This condition is not identical to miscibility between lubricant and base resin in the curable polysiloxane composition, as functional groups within the base resin are consumed upon curing and the base resin can become self-tethered, which can impact the solubility of components of the polysiloxane composition. Lubricant miscibility in a cured product or composition can be experimentally evaluated by selecting a lubricant which appreciably swells the cured product. More directly, lubricant miscibility in a cured product can be directly observed by the clarity of a slippery coating including the lubricant and cured base resin. In some cases, where the lubricant structure and the base resin structure are nearly identical, the lubricant may achieve miscibility in the base resin and in the cured product, but fail to produce a lubricious surface or overlayer.

Without wishing to be bound to any particular theory, it is believed that this effect can be due to a very large thermodynamic energy penalty disabling the partitioning of the lubricant and/or due to the unfavorably slow kinetics to achieve a lubricant overlayer within a practically useful time frame. Ultimately, the lubricant selection process should be driven by achieving all three experimentally confirmable criteria: miscibility with a base resin, miscibility in the cured product or coating, and formation of a lubricious surface after curing.

The suitability of a lubricant also can be affected by its molecular weight and concentration in the base resin. The molecular weight of the lubricant effectively modifies the solubility of the lubricant in the base resin by affecting the ratio of the lubricant's end (terminal) chemical groups relative to its backbone chain chemical groups, which may have different solubility in the base resin. In some cases, tuning the molecular weight of the lubricant can be an effective approach for achieving a transparent, cured, polysiloxane composition that presents a lubricant overlayer, i.e., a slippery coating. In some cases, tuning the molecular weight of the lubricant can be an effective approach for controlling the kinetics of forming an LOL and the regeneration of an LOL because smaller molecules tend to partition at a faster rate.

For example, in a pure dimethylsiloxane unit system, silanol lubricants of high molecular weight can achieve miscibility but do not produce a lubricious surface (LOL) while silanols having too low of a molecular weight cannot achieve miscibility with the cured product. In this case, adjusting the molecular weight of the silanol lubricant to a range corresponding to about 1000 cSt to about 100 cSt results in a suitable system that achieves both complete miscibility with the base resin and the cured product, and generation of a lubricant overlayer upon curing the polysiloxane composition.

The concentration of the lubricant in the curable polysiloxane composition (e.g., in comparison to the concentration of the base resin) can also impact ability of the polysiloxane composition or system to meet the three selection criteria described above. In particular, systems with a low lubricant concentration usually can meet the base resin and cured product solubility criteria, but fail to produce a lubricious surface after curing. Alternatively, systems with lubricant concentrations that are too high can show poor miscibility but can produce a lubricious surface. Such systems tend to have compromised optical and mechanical properties, thereby making them less suitable for many applications. For example, in dimethylsiloxane unit containing systems, a concentration of about 10 to about 150 parts, or more, of lubricant relative to a base resin (100 parts) appears suitable to achieving a transparent, cured polysiloxane composition that presents a continuous lubricious overlayer and/or antifouling properties. Although the lower range of about 9% lubricant may not provide a "visible" LOL, indirect evidence of an LOL can be present. For example, paper contacting such a surface can pick up lubricant and such surfaces can exhibit good performance on a slippery surface.

Figure 6:
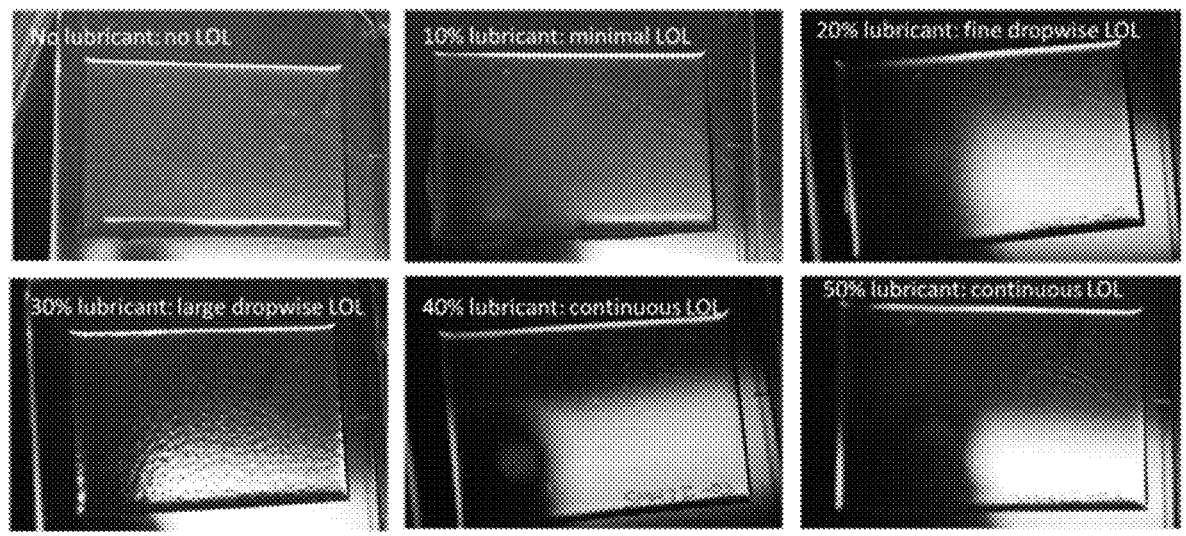
FIG. 6 shows photographs of a glass slide having no anti-fouling coating and glass slides coated with an anti-fouling coating of the present teachings, where the curable polysiloxane compositions used to make the anti-fouling coatings have a different concentrations or weight percentages of lubricating liquid. (Top left to right, Example 3F, Example 3E, Example 3D, Bottom left to right Example 3C, Example 3B, Example 3A).

Cured polysiloxane compositions with a lubricious overlayer can present the lubricant in partial or continuous form on the cured, base resin surface. As shown in FIG. 6, the coverage form of the overlayer can be controlled by selecting a lubricant that can fully wet the cured product. The concentration of the lubricant also can be used to tailor the morphology of the lubricant overlayer. Lower concentrations of lubricant typically result in a partial or a dropwise surface coverage while higher concentrations can result in a continuous lubricant overlayer ("cLOL"). In some embodiments, dLOL on a flat cured polysiloxane composition can be rendered a cLOL by introducing surface roughness to the cured coating. The surface roughness can be introduced by casting the material against another textured surface (e.g., molding/imprinting) or by introducing particles at a sufficiently high load such that the concentration of the particles at the interface is high enough to give rise to a surface with roughness factor, R, greater than 1 (but the top surface will be still covered with a thin layer of silicone material instead of the solid particles itself sticking out directly to the outer interface). The transition of dLOL to cLOL can be expected and described by the Wenzel equation.

Additional components in the curable polysiloxane compositions of the present teachings can include one or more of diluents, rheology modifiers, wetting agent, leveling agent, adhesion promoters, reaction inhibitors, pigments, fragrance, drugs or other small molecules as payloads, and fillers as reinforcing agents and/or physical barriers for the lubricant migration. Such components can have an impact on lubricant miscibility with the system, as well as the ability of the system to present a lubricious surface. Addition of such components may require tuning of lubricant concentration, molecular weight, and structure to maintain miscibility and cured product lubricity.

Figure 17:
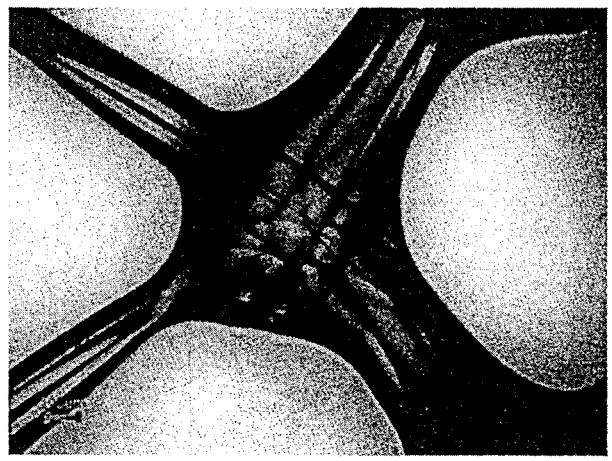
FIG. 17 is a photograph showing a section of a mesh coated with an embodiment of an anti-fouling coating of the present teachings. (Example 3A).
Figure 18:
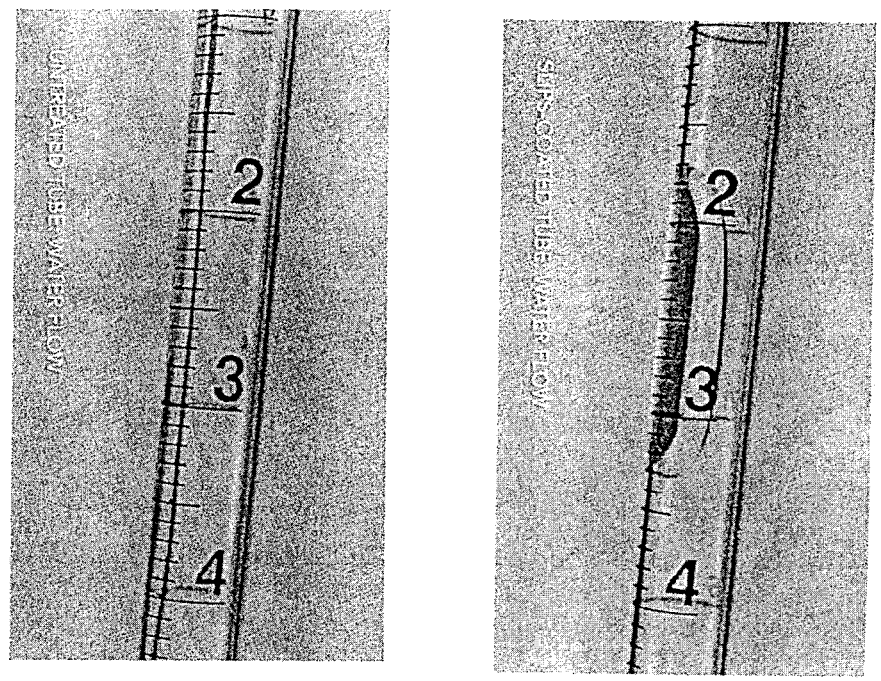
FIG. 18 is a photograph showing water transported by a section of uncoated tubing (left) and tubing coated with an embodiment of an anti-fouling coating of the present teachings (right). (Right, Example 3A).
Figure 19:
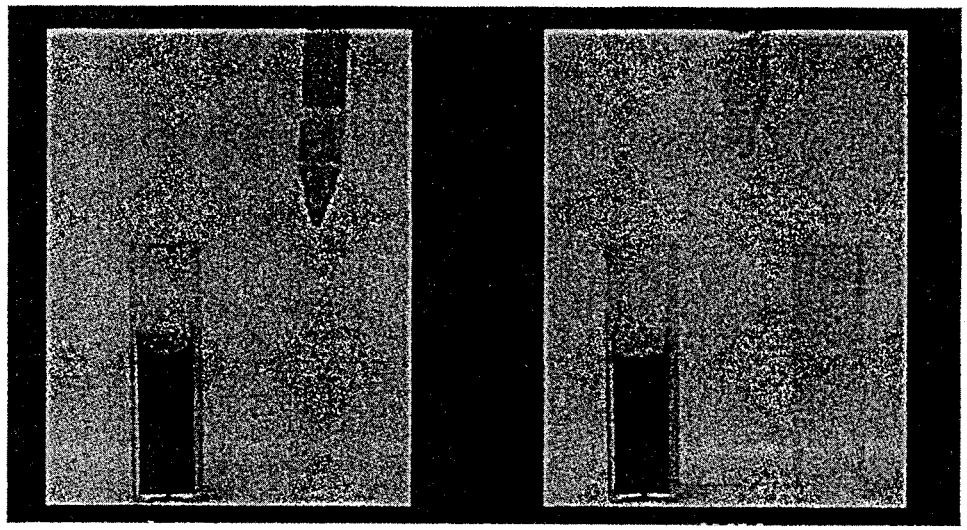
FIG. 19 is a photograph showing an uncoated plastic lens (left) and a plastic lens coated with an embodiment of an anti-fouling coating of the present teachings (right), after both have been dipped in porcine blood. (Right, Example 3A).

Use of the cured compositions and slippery coatings and materials of the present teachings can include, but are not limited to, coatings on existing products, where the curable polysiloxane compositions can be applied using common solution deposition techniques (e.g., coating, spraying, rolling, brushing, dip-coating, drop-coating, spin-coating, draw down-coating, transfer printing, relief printing, gravure printing, offset printing, screen printing, contact printing, inkjet printing, simple casting, die slot casting, slit casting, curtain casting, air knife casting, molding, extruding and/or two-dimensional (2D) printing or three-dimensional (3D) printing. Using these or other techniques complex objects such as meshes as shown in FIG. 17, or the interior surface of tubes as shown in FIG. 18, or cone-shaped plastic lens as shown in FIG. 19, or a surface requiring a patterned slippery coating, or any other complex geometry can be coated to achieve a slippery coating benefit. The coating can be of below about 1 μm thickness and conform to complex surface texture, including microscopic channels. The thickness of the coating can be sub-micron, i.e., less than 1 μm or can be up to about 1 mm, or greater.

Figure 16:
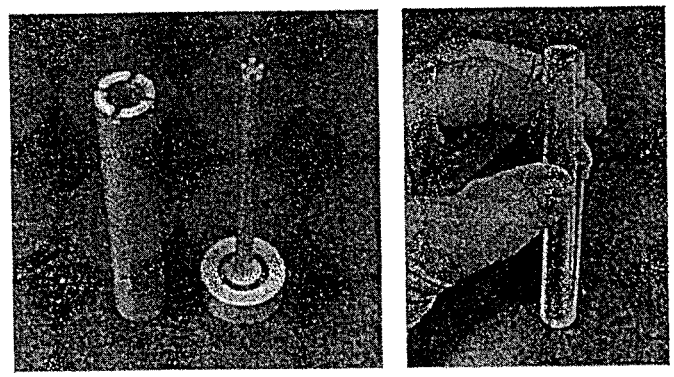
FIG. 16 is a photograph showing example mold (left) and resulting tubing (right) composed of an embodiment of an anti-fouling coating of the present teachings. (Example 3A).

Additionally, a slippery coating can be applied on top of any other coating, at any thickness, formed as a ready-to-use adhesive film, cast, molded, or overmolded into a free-standing structure as shown in FIG. 16. The curable polysiloxane compositions can be 3D-printed, extruded, or injection molded to form a structure or part (such as a tube, a cone, a sheet, an O-ring, a bag, a membrane, film or any other complex geometry) as well as to be applied as a coating on a structure or part using such techniques.

Additionally, a slippery coating can be applied to any flexible or rigid containers that are formed by folding or using films for the former and by coating the slippery coating (e.g. by spray coating) for the latter. In particular, bag or pouch packaging with a slippery internal and/or external surface can be produced with compositions of present teachings by partially coating with compositions described herein such as slippery coatings and curable polysiloxane compositions using techniques such as zone coating or screen printing of curable polysiloxane compositions followed by folding and sealing films to construct a container.

The curable polysiloxane compositions of the present teachings can be used to create slippery coatings on the surface of various consumer products including razor blades and/or a shaving device such as a razor that uses a razor blade. For example, many commercially-available razors include a lubricating strip adjacent to the razor blade. The slippery coatings of the present teachings can be used as such a lubricating strip, which slippery coating or the material itself can include a reservoir of lubricating liquid to increase the useful lifetime of the lubricious coating. The slippery coatings of the present teachings can be located elsewhere on the shaving device (e.g., razor), for example, on one or more surfaces of the shaving device, or even the entirety of the razor that contacts the skin to be shaved. Again, any of the slippery coatings associated with a shaving device (e.g., a surface of a razor) or a razor blade can include a reservoir of lubricating liquid in fluid communication with the slippery coating.

The curable polysiloxane compositions of the present teachings can be used to make a transparent slippery coating. Medical applications for the curable polysiloxane compositions of the present teachings include endoscopes and other lens-containing camera devices used to travel and visualize inside the body. Medical applications also include catheters such as vascular and urinary catheters, G-tube, drainage tubes, and meshes used for hernia repair. Similarly, optically clear lenses and windows used in marine or other submerged environments where fouling, biological organisms, marine organisms, fogging, and blood can be a problem.

The curable polysiloxane compositions of the present teachings can be combined with fillers and pigments to make an anti-fouling paint formulations. Such compositions can be used for marine applications such as paint for parts in contact with a marine environment.

Industrial applications for the curable polysiloxane compositions of the present teachings can include a release coating and a slippery coating for vessels, pipes, tanks, bags, containers, lids, mixers, reactors, fittings and the like, which contact sticky or fouling materials such as paints, latex, cosmetic products, pesticides, adhesives, sealants, glues, and viscous food products. Packaging and containers for sticky consumer products and/or viscous complex liquids, such as peanut butter, paints, cosmetic lotions, can be another use of the slippery coatings of the present teachings, and in particular, when used on the interior surface of the packaging or container.

The curable polysiloxane compositions of the present teachings can be used as an insect repelling barrier, particularly in film, spray, or Do-It-Yourself kit form.

The curable polysiloxane compositions can be infused as liquids into porous substrates such as paper, membrane, mesh, fiber, or fabric to form the slippery coatings and materials that are embedded and/or interconnected mechanically with the porous substrate for structural integrity and providing its slippery properties and characteristics. In various embodiments, these materials can be cut, folded such as origami, bonded and/or woven, to construct a new three-dimensional object with slippery and/or anti-fouling surface properties for additional utilities.

The curable polysiloxane compositions of the present teachings can be used as a component of a 3D printer, for example, to prevent unwanted sticking of the fused filament material on the hot end and nozzles, silver paste and inks around the nozzles and needles, printed objects too strongly sticking to the build plates, uncured materials sticking to the build plates, and to help continuously lubricate nozzles such as mechanically rubbing the nozzles against the compositions of the present teachings.

The following examples are provided to illustrate further and to facilitate the understanding of the present teachings and are not in any way intended to limit the invention. The ratios in the examples refer to weight ratios unless otherwise specified.

Example 1. Polysiloxane Compositions Utilizing Commercial Formulation as Base Resin Part A and Part B of Sylgard® 184 silicone elastomer formulation (Dow Corning) was mixed at 5:1, 10:1, and 20:1 ratios. To this base was added 50 parts (providing 33% lubricating liquid in final composition), 100 parts (providing 50% lubricating liquid in final composition), or 200 parts (providing 67% lubricating liquid in final composition) of DMS-S27 (silanol-terminated polydimethylsiloxane) (Gelest, Inc.), where parts are based on total weight of Sylgard 184.

Each mixture was cast into a film and cured at 90° C. for 6 hours. The resulting cured films presented a lubricious surface having a lubricant overlayer.

Example 2. Polysiloxane Compositions Including a Silanol-Terminated PDMS Lubricant

Example 2A (JL06-4d)

Part A: 15.0 parts of DMS-V31 (vinyl-terminated polydimethylsiloxane) (Gelest, Inc.), 15.0 parts of DMS-S27, 0.05 parts of SID4613.0 (1,3-divinyltetramethyldisiloxane) (Gelest, Inc.) and 0.20 parts SIP6830.3 (platinum-divinyltetramethyldisiloxane complex) (Gelest, Inc.) were combined in a speed mixing cup capable of holding twice the volume of ingredients and speed mixed for one minute at 3500 rpm.

Part B: 14.0 parts of DMS-V31, 15.0 parts of DMS-S27, and 1.0 part of HMS-301 (trimethylsiloxane terminated co-polymer of methylhydrosiloxane and dimethylsiloxane) (Gelest, Inc.) were combined in a speed mixing cup capable of holding twice the volume of ingredients and speed mixed for one minute at 3500 rpm.

Each of Part A and Part B was added to a 2-part syringe, the air was purged, and the syringe capped. Part A and Part B were combined shortly before use.

Example 2B (JL06-5d)

Part A: 15.0 parts of DMS-V31, 17.0 parts of DMS-S27, 5.0 parts of hexamethyldisiloxane (Sigma-Aldrich), 2.0 parts of Aerosil® R 8200 hydrophobic fumed silica (Evonik), 0.05 parts of SID4613.0 and 0.20 parts SIP6830.3 were combined in a speed mixing cup capable of holding twice the volume of ingredients and speed mixed for one minute at 3500 rpm.

Part B: 14.0 parts of DMS-V31, 17.0 parts of DMS-S27, 5.0 parts of hexamethyldisiloxane, 2.0 parts of Aerosil R 8200 silica, and 1.0 part of HMS-301 were combined in a speed mixing cup capable of holding twice the volume of ingredients and speed mixed for one minute at 3500 rpm.

Each of Part A and Part B was added to a 2-part syringe, the air was purged, and the syringe capped. Part A and Part B were combined shortly before use.

Example 2C (JL06-J41)

Part A: 18.9 parts of VQM-135 (vinyl Q resin dispersion) (Gelest, Inc.), 19.2 parts DMS-S27, 0.078 parts SIT7900.0 (1,3,5,7-tetravinyl-1,3,5,7-tetramethylcyclotetrasiloxane) (Gelest, Inc.) and 0.198 parts SIP6830.3 were combined in a speed mixing cup capable of holding twice the volume of ingredients and speed mixed for one minute at 3500 rpm.

Part B: 15.7 parts of VQM-135, 19.2 parts DMS-S27 and 3.45 parts of HMS-301 were combined in a speed mixing cup capable of holding twice the volume of ingredients and speed mixed for one minute at 3500 rpm.

Each of Part A and Part B was added to a 2-part syringe, the air was purged, and the syringe capped. Part A and Part B were combined shortly before use.

Example 3. Polysiloxane Compositions Including a Fluorosiloxane Lubricant

Example 3A (SM47i-02)

Part A: 18.9 parts VQM-135, 19.2 parts Gransil DM-100 (trifluoromethyl C1-4 alkyl dimethicone) (Grant Industries), 0.078 parts SIT7900.0 and 0.198 parts SIP6830.3 were combined in a speed mixing cup capable of holding twice the volume of ingredients and speed mixed for one minute at 3500 rpm.

Part B: 15.7 parts of VQM-135, 19.2 parts Gransil DM-100 and 3.45 parts of HMS-301 were combined in a speed mixing cup capable of holding twice the volume of ingredients and speed mixed for one minute at 3500 rpm.

Each of Part A and Part B was added to a 2-part syringe, the air was purged, and the syringe capped. Part A and Part B were combined shortly before use.

Example 3B (SM47i-03)

Same as Example 3A except 12.8 parts Gransil DM-100 was used in Part A and in Part B.

Example 3C (SM47i-04)

Same as Example 3A except 8.2 parts Gransil DM-100 was used in Part A and in Part B.

Example 3D (SM47i-05)

Same as Example 3A except 4.8 parts Gransil DM-100 was used in Part A and in Part B.

Example 3E (SM47i-06)

Same as Example 3A except 2.1 parts Gransil DM-100 was used in Part A and in Part B.

Example 3F (SM47i-07 or SM47i Base)

Same as Example 3A except no Gransil DM-100 was used in Part A or in Part B.

Example 4. Polysiloxane Compositions Including a Polyalphaolefin Lubricant

Example 4A 15 parts PDV-1635 (vinyl-terminated dimethylsiloxane co-polymer) (Gelest, Inc.), 7 parts VQX-221 (vinyl Q resin dispersion) (Gelest, Inc.), 3 parts HMS-301, 0.078 parts SIT7900.0, 0.198 parts SIP6830.3 and 20 parts SpectraSyn 2C (polyalphaolefin-synthetic basestock) (Exxon Mobil Oil Corporation) were combined in a speed mixing cup capable of holding twice the volume of ingredients and speed mixed for one minute at 3500 rpm.

Example 5. Adhesive Film Product

Polysiloxane compositions of the present teachings can be applied to a multi-layered film construction including an adhesive (layer) and release liner(s). This approach can result in a "stick-on" foul-impeding or anti-fouling or anti-ice adhesive film product where the release liner adjacent the polysiloxane compositions can be removed before use to expose a surface that becomes anti-fouling upon formation of an LOL.

Figure 7:
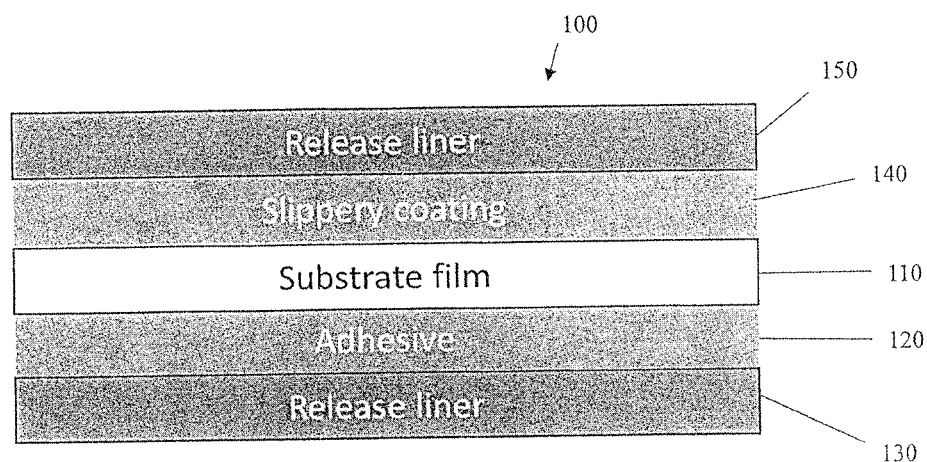
FIG. 7 is a schematic cross-sectional diagram of an adhesive film product of the present teachings (Example 5).

One example of an adhesive film product is depicted in FIG. 7. As shown in FIG. 7, the adhesive film product 100 can include a substrate film 110, which can be transparent. On one side of the substrate film 110 includes an adhesive or an adhesive layer 120. The adhesive layer 120 can include a release liner 130 opposite the substrate film 110. The surface of the substrate film 110, opposite the adhesive layer 120, can include a one-pot curable polysiloxane composition and/or a slippery coating 140 as described herein. To maintain the integrity of the product prior to use, a second release liner 150 can be adjacent to and/or in contact with the exposed surface of the one-pot curable polysiloxane composition and/or slippery coating. After 7 days of water immersion, the presence of LOL can be visibly confirmed by an oil sheen and coatings still maintain slippery properties.

Materials with the following characteristics are considered as having 'slippery properties':

Roll-off angle for water: typically less than 5° with 10 uL droplet. Materials without LOL typically show roll-off angle>15°.

Droplet racing tests: several 15 uL droplets applied onto a flat sample tilted at 15° show measurable droplet moving speed at least 1 mm/s when tested on a freshly prepared sample. This property may slightly decrease and the droplet speed may become a slightly smaller value. However, the droplet will still move at measurable speed (>0.5 mm/s). Conventional amphiphilic compositions do not show such behavior.

Materials with the following characteristics are considered as having 'amphiphilic character': Dynamic water contact angle (WCA) measurement: water droplet is placed on the coating surface and contact angle measurements are obtained at 5 s, 30 s, 60 s and 120 s time lapses. The wetting behavior shows dynamic WCA (i.e. WCA value decreases over time) caused by fast surface rearrangement to present polar groups (e.g. PEG groups) upon exposure to water. After 7 days of water exposure and subsequent drying for 3 hr the surface maintains similar dynamic WCA behavior as was seen before immersion (hydrophobic recovery). Most importantly and contrary to intuition, these plysiloxanes with lubricous surfaces slippery (a.k.a. PLUS) surfaces with LOL are still able to repel water despite the incorporation of amphiphilic character to the coating, which is a unique property only seen from these new compositions of matter.

Materials Used in Following Examples 6-10:

Silanol terminated polydimethyl siloxane; DMS-545, DMS-535, DMS-531, and DMS-S15 (Gelest Inc.) Poly(diethoxysiloxane); PSI-021 (Gelest Inc.)

3-{2-[Acetoxy(polyethylenoxy)propyl]}heptamethyltrisiloxane; SIA0075.0 (Gelest Inc.)

Monocarbinol terminated polydimethylsiloxane; MCS-C13 (Gelest Inc.)

Carbinol (hydroxyl) terminated polydimethyl siloxane; DBE-C25 (Gelest Inc.)

3-Isocyanatopropyltriethoxysinane; SII6455.0 (Gelest Inc.

Dibutyltin dilaurate; DBTDL (Sigma Aldrich)

Fluoro silicone fluid containing trifluoroalkyl groups; Gransil DM-100 (Grant Industries)

Zinc omadine powder (Lonza, Inc.)

Example 6

Figure 27:
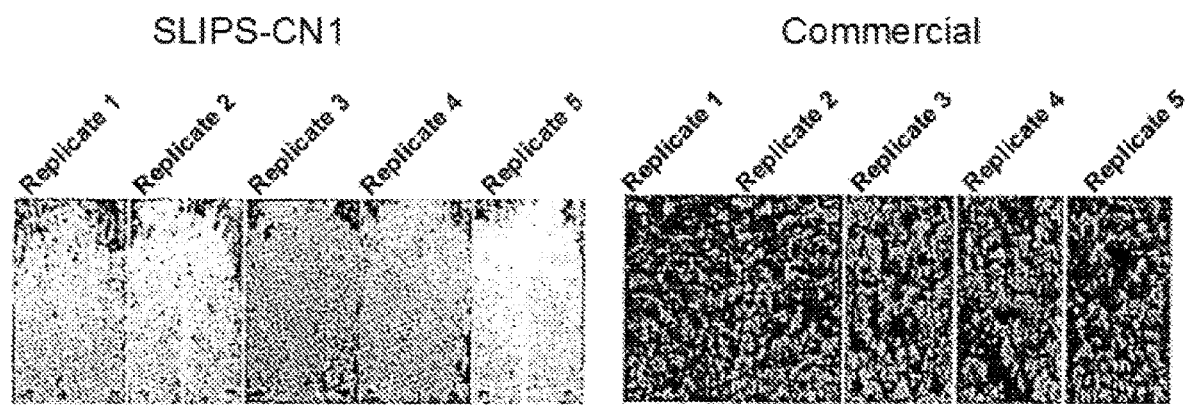
FIG. 27 is a visual comparison of fouling accumulation on PLUS-CN1 and polysiloxane based commercial standard after 36 days of static immersion in Port Canaveral, Fla.

Curable self-lubricating slippery coating (PLUS) was prepared by condensation of polysiloxane resins with the presence of appropriate lubricant(s) (Table 1). Silanol-terminated PDMS DMS-S45 (5.9 wt %), DMS-S35 (23.5 wt %), DMS-S31 (47.1 wt %), and DMS-S15 (23.5 wt %) were combined to prepare a blend which was used in the formulations described here. Silanol blend is maintained between 95% to 40% by weight of the formulation. Ideally 57 wt % proportion of silanol was used. Total lubricant content can range from 10-70 wt %. Gransil DM-100 was used as the lubricant in this example; 27.75% was used in Part A and 5.70 was used in Part B. Crosslinker PSI-021 (2-12 wt %) is used to form the elastomer. Ideally 8.6 wt % of PSI-021 was used in the composition. DBTDL is used as the catalyst in 0.05-1.5 wt %, more specifically 0.5-1 wt %. Formulations were applied on primed substrates and cure at ambient conditions for 24 hrs. Leading polysiloxane based commercial fouling release paint from International Paint was used as a reference for field immersion in Melbourne Fla. During static immersion PLUS-CN1 showed significantly less accumulation of fouling compared to commercial reference (FIG. 27).

TABLE 1

| Formulation composition for PLUS-CN1 | | |
|---|---|---|
| | PLUS-CN1 | |
| Formulations | Wt % | Amount (g) |
| Part A | | |
| Silanol terminated PDMS (blend) | 56.94 | 297.50 |
| Gransil DM-100 | 27.75 | 145.00 |
| PSI-021 | 8.61 | 45.00 |
| Part B | | |
| Gransil DM-100 | 5.70 | 29.75 |
| DBTDL | 1.00 | 5.25 |
| Total | 100 | 522.50 |

Example 7

Figure 28:
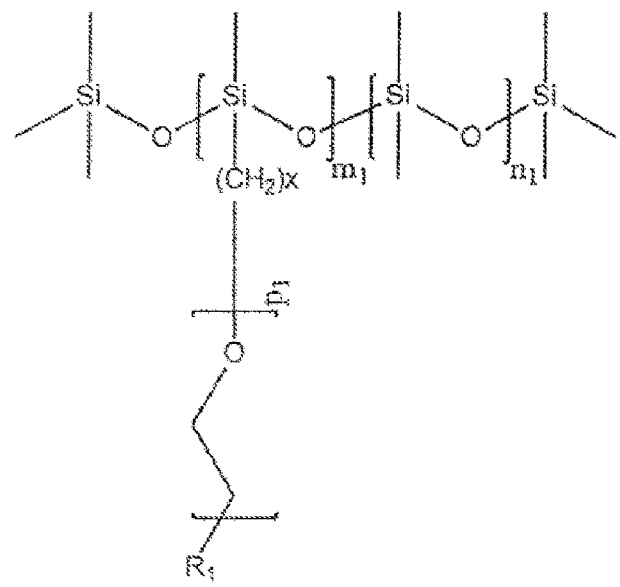
FIG. 28 shows a representative formula of amphiphilic surface active polymers (SAP-1 and others with pendent PEG groups) used for preparing amphiphilic PLUS.

Surface active amphiphilic polymer with structure in FIG. 28 was used to prepare PLUS materials with amphiphilic character. Having the PEG chain(s) attached to PDMS allows effective stratification or surface migration of PEG groups providing amphiphilic character to the surface. The number of PEG units (p1) should be 1-16, but it is ideal to have p1=6-12 at which PEG is known to provide protein resistant properties. The alkyl group (CH2) linking the PEG to siloxane should at least have X=3-20, ideally X=3. In the polymer m1 can range from 1-50 and n1 can range from 0-250. The alkyl group, R1, can be —OCO—CH3, —CH2CH2CH2-Si—(O—CH2CH3)3, —CH2CH2CH2-

Si—(O—CH3)3, or silyl ether group linked through carbamate group (—OCONH—) as depicted in FIG. 29. Where Y can be 3-20 and Z can be —CH3, —CH2CH3, or CH2CH2CH3.

Preparation of Surface Active Polymer 1 (SAP-1)

In a 20 mL flask, MCS-C13 (5 g) was subjected to constant stirring under N2. Isocyanate terminated silyl ether SII6455.0 (2.38 g) was added to the flask along with 0.05 g of DBTDL catalyst solution (1% in Xylenes). Other catalyst such as dibutyltin diacetate (DBTDAc), 1,8-Diazabicyclo (5.4.0)undec-7-ene (DBU) and 1,4-diazabicyclo(2.2.2)octane (DABCO) can also be used in place of DBTDL. The reaction was allowed to mix at ambient temperature. The reaction can be carried out at elevated temperature (40-80° C.) allowing shorter reaction time. The reaction was monitored using FTIR and disappearance of NCO peak at 2200-2250 cm−1 indicated reaction completion. After 24 hrs, the hydroxyl peaks from starting material MCS-C13 has disappeared and C=O and N—H peaks corresponding to urethane linkage appeared at 1724 cm−1, 3346 cm−1 and 1534 cm−1 respectively (FIG. 30). Resulting clear resin (SAP-1) was used in compositions described here to obtain amphiphilic slippery coatings. In SAP-1, X=3, m1=1, n1=0-1, p1=6-9, Y=3, and Z=CH2CH3.

Example 8

Surface active amphiphilic polymer with structure in FIG. 31 was used to prepare PLUS material with amphiphilic character. The number of PEG units (p2) may be 1-16, ideally p2=6-13. The alkyl group (CH2) linking the PEG to siloxane should at least have X=3-20, ideally X=3. In the polymer, n1 can range from 0-250. The alkyl R1 group can be —OCO—CH3, —CH2CH2CH2-Si—(O—CH2CH3)3, —CH2CH2CH2-Si—(O—CH3)3, or ideally a silyl ether group linked through carbamate group (—OCONH—) as depicted in FIG. 29. Where Y can be 3-20 and Z can be —CH3, —CH2CH3, or CH2CH2CH3.

Synthesis of surface active polymer 2 (SAP-2)

Hydroxyl functional DBE-C25 (5 g) was added into a 20 mL reaction flask and the content was subjected to constant stirring under N2. Isocyanate terminated silyl ether SII6455.0 (0.716 g) was added to the flask along with 0.05 g of DBTDL catalyst solution (1% in Xylenes). Other catalyst such as dibutyltin diacetate (DBTDAc), 1,8-Diazabicyclo(5.4.0)undec-7-ene (DBU) and 1,4-diazabicyclo(2.2.2)octane (DABCO) can also be used in place of DBTDL. The reaction was allowed to mix at ambient temperature. Shorter reaction time may be facilitated by elevated temperature (40-80° C.). The completion of the reaction was monitored using FTIR. Resulting clear resin (SAP-2) was used in coating compositions described in the present invention to obtain amphiphilic slippery coatings. In SAP-2, X=3, n2=30-45, p2=10-13, Y=3, and Z=CH2CH3.

Example 9

Silanol terminated PDMS DMS-S45 (5.9 wt %), DMS-S35 (23.5 wt %), DMS-S31 (47.1 wt %), and DMS-S15 (23.5 wt %) were combined to prepare a blend which was used in the formulations described here. Silanol blend is maintained between 95% to 40% by weight of the formulation. Ideally 93.50-46.75 wt % proportion of silanol was used. Surface active amphiphilic polymer (SIA0075.0) is embodied at 0.25-25 wt %. Specifically, about 0.25-0.5 wt % of SIA0075.0 was used for the formulations. Crosslinker PSI-021 (2-12 wt %) is used to form the elastomer. Ideally 2.5-5.0 wt % of PSI-021 was used in the compositions. Gransil DM-100 is used as the lubricant in PLUS formulations. About 10-70 wt % of lubricant is typically used in formulations. Ideally 33-50% of lubricant was used in compositions described here. DBTDL was used as the catalyst in 0.05-1.5 wt %, more specifically 0.5-1 wt %. Formulations are applied on primed substrates and cure at ambient conditions for 24 hrs. PLUS Control-1 serves as a composition that demonstrate the characteristics of the matrix and PLUS-AM1 and PLUS-AM2 represent amphiphilic PLUS (slippery coating) formulations with slight tuning in lubricant composition (Table 2).

TABLE 2

Formulation composition for PLUS Control-1, PLUS-AM1, and PLUS-AM2

| Formulations | PLUS Control-1 | | PLUS-AM1 | | PLUS-AM2 | |
|---|---|---|---|---|---|---|
| | Wt % | Amount (g) | Wt % | Amount (g) | Wt % | Amount (g) |
| Part A | | | | | | |
| Silanol terminated PDMS (blend) | 93.50 | 18.70 | 62.30 | 12.46 | 46.75 | 9.35 |
| SIA0075.0 | 0.50 | 0.10 | 0.34 | 0.067 | 0.25 | 0.05 |
| PSI-021 | 5.00 | 1.00 | 3.35 | 0.67 | 2.50 | 0.50 |
| Part B | | | | | | |
| Gransil DM-100 | 0.00 | 0.00 | 33.35 | 6.67 | 50.00 | 10.00 |
| DBTDL | 1.00 | 0.20 | 0.66 | 0.133 | 0.50 | 0.10 |
| Total | 100 | 20.00 | 100 | 20.00 | 100 | 20.00 |

Figure 32:
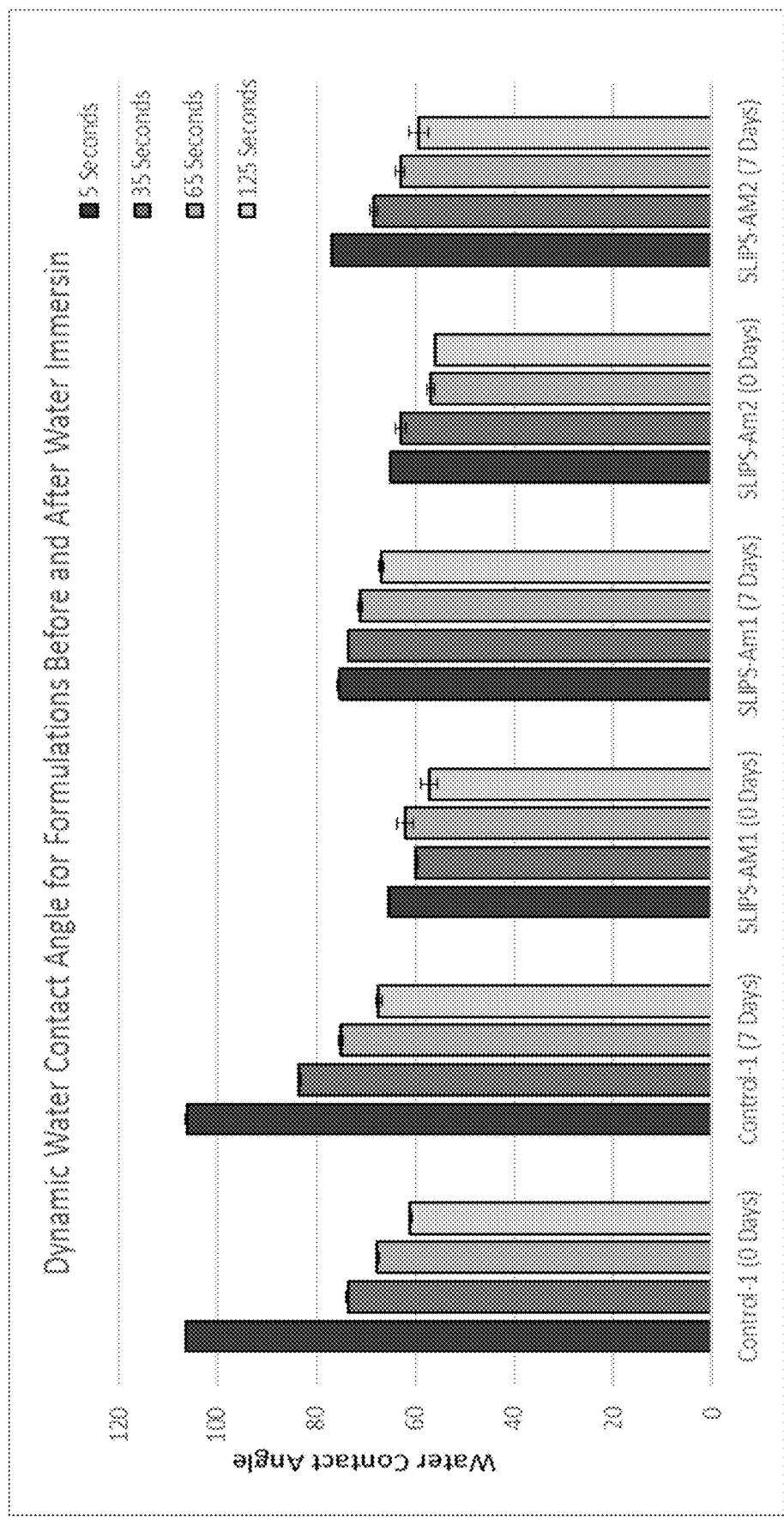
FIG. 32 shows water contact angle measurements for coating compositions described in example 3.

Coatings PLUS-1 and PLUS-2 show <5° roll-off angle for water compared to control-1 (having >15° roll-off angle). Water contact angle (WCA) measurements were obtained for all three formulations under as-made conditions and following 7 days of water immersion. After 7 days of water immersion, the presence of LOL was visibly confirmed by an oil sheen and coatings show slippery properties as defined by WCA, roll-off angle (typically less than 5° with 10 uL droplet) and droplet racing tests (15 uL droplet at 15° tilt show measurable droplet moving speed at least 1 mm/s when tested on a freshly prepared sample). In order to observed dynamic wetting behavior, water droplet was placed on the coating surface and contact angle measurements were obtained at 5 s, 30 s, 60 s and 120 s time lapses. The wetting behavior of control-1 (without a LOL) shows dynamic WCA, meaning fast surface rearrangement to present PEG groups upon exposure to water. After 7 days of exposure control-1 was dried for 3 hr and WCA is measured. The coating shows similar dynamic WCA as before immersion (hydrophobic recovery). The control is more representative of the matrix in PLUS-AM1 and PLUS-AM2. PLUS-AM1 and PLUS-AM2 both show unique 'combined slippery and dynamic wetting' behavior in contrast to control-1. The magnitude of WCA change is slightly less prominent in the presence of thin LOL when compared to that of dry control-1 (FIG. 32).

Several drops of water (15 µL) were released on to PLUS coatings placed at a 15° tilt angle. The speed of the droplets traveling for a 2" long vertical path was measured. Droplet travelled much faster on PLUS-AM1 and PLUS-AM2 compared to PLUS control-1 clearly demonstrating slippery behavior associated to the presence of LOL (FIG. 32). For PLUS-AM1, a slight decrease in droplet speed was observed after 2 days of immersion. However, after 7 days of immersion PLUS-AM1 maintained the slippery properties with similar droplet speed as for 2 day immersion. Initially, PLUS-AM2 shows higher droplet speed compared to PLUS-AM1. PLUS-AM2 shows a linear decrease in droplet speed at 0, 2, and 7 days of water immersion respectively. Most importantly and contrary to intuition, the PLUS surfaces with LOL are able to repel water despite the incorporation of amphiphilic character to the coating, which is a unique property only seen from these new compositions of matter.

Example 10

Blend of silanol terminated PDMS similar to composition described in example 8 was used. In these compositions, the amount of silanol blend is maintained between 95% to 40% by weight of the formulation. Ideally 93.50-46.75 wt % proportion of silanol was used. Surface active amphiphilic polymer 1 (SAP-1) is incorporated at 0.25-25 wt % in PLUS control 2 and PLUS-AM3 formulations. preferably, about 0.25-0.5 wt % of SAP-1 was used for the formulations. Crosslinker PSI-021 (2-12 wt %) is used to form the elastomer. Ideally 2.5-5.0 wt % of PSI-021 was used in the compositions. Gransil DM-100 is used as the lubricant in PLUS formulations. About 10-70 wt % of lubricant is can be used in formulations. Ideally 50% of lubricant was used in amphiphilic PLUS compositions described here. DBTDL is used as the catalyst in 0.05-1.5 wt %, more specifically 0.5-1 wt %. Formulations are applied on primed substrates and cure at ambient conditions for 24 hrs. For PLUS control-3 and PLUS-AM4, all other ingredient compositions were similar to that of PLUS control 2 and PLUS-AM3 except SAP-2 was incorporated in the formulations in place of SAP-1. PLUS Control-2 and PLUS control-3 serves references for matrix characteristics whereas PLUS-AM3 and PLUS-AM4 represent the slippery coatings with amphiphilic character (Table 3).

TABLE 3

Formulation composition for Control-2, Control 3, PLUS-AM3, and PLUS-AM4

| Formulations | PLUS Control-2 Wt % | Amount (g) | PLUS-AM3 Wt % | Amount (g) | PLUS Control-3 Wt % | Amount (g) | PLUS-AM4 Wt % | Amount (g) |
|---|---|---|---|---|---|---|---|---|
| Part A | | | | | | | | |
| Silanol terminated PDMS (blend) | 93.50 | 18.70 | 62.30 | 9.35 | 93.50 | 18.70 | 46.75 | 9.35 |
| SAP-1 | 0.50 | 0.10 | 0.25 | 0.05 | 0.00 | 0.00 | 0.00 | 0.00 |
| SAP-2 | 0.00 | 0.00 | 0.00 | 0.00 | 0.50 | 0.10 | 0.25 | 0.05 |
| PSI-021 | 5.00 | 1.00 | 2.50 | 0.50 | 5.00 | 1.00 | 2.50 | 0.50 |
| Part B | | | | | | | | |
| Gransil DM-100 | 0.00 | 0.00 | 50.00 | 10.00 | 0.00 | 0.00 | 50.00 | 10.00 |
| DBTDL | 1.00 | 0.20 | 0.50 | 0.10 | 1.00 | 0.20 | 0.50 | 0.10 |
| Total | 100 | 20.00 | 100 | 20.00 | 100 | 20.00 | 100 | 20.00 |

The present teachings encompass embodiments in other specific forms without departing from the spirit or essential characteristics thereof. The foregoing embodiments are therefore to be considered in all respects illustrative rather than limiting on the present teachings described herein. Scope of the present invention is thus indicated by the appended claims rather than by the foregoing description, and all changes that come within the meaning and range of equivalency of the claims are intended to be embraced therein. amphiphilic character.

The invention claimed is:
1. A curable polysiloxane composition comprising:
A base resin composition capable of a condensation reaction for curing, the base resin composition comprising:
(i) a compound comprising hydrolyzable alkoxy, enoxy, oxime, amine, ethoxy, methoxy, or acetoxy silane groups;
(ii) a polysiloxane comprising one or more silanol groups capable of undergoing a condensation reaction with the hydrolysable groups of the compounds of (i); and
(iii) a surface active polymer having a structure according to Formula I or Formula II,

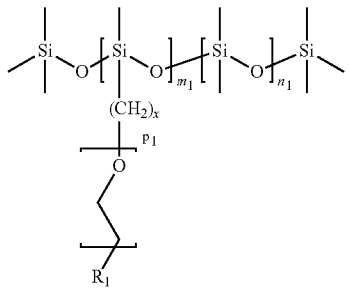

Formula I

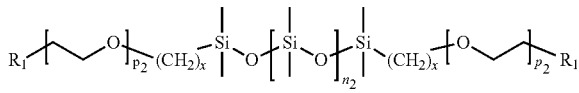

Formula II

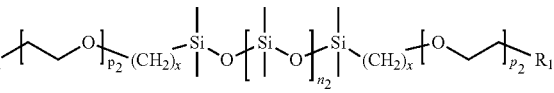

where $m_1$ is an integer 1 to 50, $n_1$ is an integer 0 to 250, $p_1$ is an integer 1 to 16, $n_2$ is an integer 0 to 250, each occurrence of $p_2$ is independently an integer 1 to 16, each occurrence of X is independently an integer 3 to 20, and each occurrence of $R_1$ is independently an ester or silyl ether group so long as at least one occurrence of $R_1$ is a silyl ether group linked through a carbamate group.

2. The curable polysiloxane composition according to claim 1, wherein the surface active polymer has a structure according to Formula I; and wherein at least one occurrence of $R_1$ has a structure according to the following formula

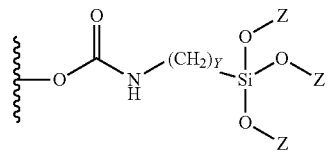

where each occurrence of Z is independently —$CH_3$, —$CH_2CH_3$, or $CH_2CH_2CH_3$, and Y is an integer from 3 to 20.

3. The curable polysiloxane composition according to claim 2, wherein X is 3, $n_1$ is 0 or 1, and $p_1$ is 6 to 16.

4. The curable polysiloxane composition according to claim 2, wherein $m_1$ is 1.

5. The curable polysiloxane composition according to claim 1, wherein the surface active polymer has a structure according to Formula II; and wherein at least one occurrence of $R_1$ has a structure according to the following formula

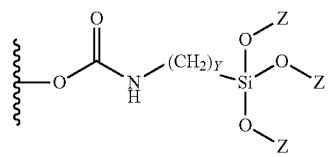

where each occurrence of Z is independently —$CH_3$, —$CH_2CH_3$, or $CH_2CH_2CH_3$, and Y is an integer from 3 to 20.

6. The curable polysiloxane composition according to claim 5, wherein X is 3, $p_2$ is 6 to 12, and $n_2$ is 30 to 45.

7. The curable polysiloxane composition according to claim 1, wherein the surface active polymer has a structure according to Formula I; and
$m_1$ is 1.

8. The curable polysiloxane composition according to claim 1, wherein the surface active polymer has a structure according to Formula I; and
$n_1$ is 0 or 1.

9. The curable polysiloxane composition according to claim 1, wherein the surface active polymer has a structure according to Formula II; and
$n_2$ is 30 to 45.

10. The curable polysiloxane composition according to claim 1, wherein X is 3.

11. The curable polysiloxane composition according to claim 1, wherein the polysiloxane composition does not exhibit micro-scale phase separation.

12. The curable polysiloxane composition according to claim 1, wherein the composition is capable of curing to form a slippery coating; and wherein the polysiloxane composition further comprises (b) a lubricating liquid, wherein the lubricating liquid is chemically and physically matched with the base resin in such a way that, when cured therewith to form a cured polysiloxane composition, the lubricating liquid spontaneously provides an overlayer of the lubricating liquid at an exposed surface of the cured polysiloxane composition to form the slippery surface.

13. The curable polysiloxane composition according to claim 12, wherein the lubricating liquid comprises at least one of a fluorosiloxane and a partially fluorinated polysiloxane.

14. The curable polysiloxane composition according to claim 12, wherein the lubricating liquid comprises at least one of a polyethyleneglycol-modified silicone, a polypropyleneglycol-modified silicone, and a hydrocarbon oil.

15. The curable polysiloxane composition according to claim 12, wherein the lubricating liquid is present in the composition at a weight percent greater than about 30% of the total weight of the polysiloxane composition.

16. A coating made by a process comprising:
applying a curable polysiloxane composition according to claim 1 to a substrate; and
curing the polysiloxane composition to form the coating.

17. The coating according to claim 16, further comprising a lubricating liquid, wherein the lubricating liquid is chemically and physically matched with the base resin in such a way that the lubricating liquid spontaneously wets the coating to provide an overlayer of the lubricating liquid at an exposed surface of the cured polysiloxane composition to form a slippery coating.

18. The coating according to claim 17, wherein the surface active polymer is reactive with the silanol groups in the polysiloxane so that they are incorporated into the cured polysiloxane composition upon curing and extend into the overlayer of the lubricating liquid at the exposed surface of the cured polysiloxane composition to form the slippery coating.

19. The coating according to claim 16, wherein the substrate is on an article selected from the group consisting of a marine vessel and other marine structures, an optical lens, a camera, a pipe, a cable, a building, and an adhesive film;

wherein the curable polysiloxane composition is combined with fillers and pigments to form a paint applied to the substrate; and
wherein the slippery coating prevents or delays accumulation of a marine organism on the substrate.

20. The coating according to claim 16, wherein the surface active polymer has a structure according to Formula I; and wherein at least one occurrence of $R_1$ has a structure according to the following formula

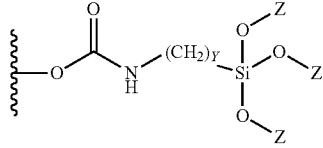

where each occurrence of Z is independently —$CH_3$, —$CH_2CH_3$, or $CH_2CH_2CH_3$, and Y is an integer from 3 to 20.

21. The coating according to claim 20, wherein X is 3, $n_1$ is 0 or 1, and $p_1$ is 6 to 16.

22. The coating according to claim 21, wherein $m_1$ is 1.

23. The coating according to claim 16, wherein the surface active polymer has a structure according to Formula II; and wherein at least one occurrence of $R_1$ has a structure according to the following formula

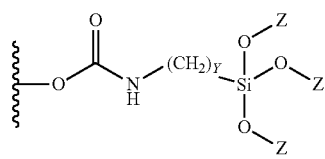

where each occurrence of Z is independently —$CH_3$, —$CH_2CH_3$, or $CH_2CH_2CH_3$, and Y is an integer from 3 to 20.

24. The coating according to claim 23, wherein X is 3, $p_2$ is 6 to 12, and $n_2$ is 30 to 45.

25. The coating according to claim 16, wherein the coating is transparent.

26. The coating according to claim 17, wherein the lubricating liquid comprises at least one of a fluorosiloxane, a partially fluorinated polysiloxane, and a fluorinated and polyethyleneglycol-modified silicone.

27. The coating according to claim 17, wherein the lubricating liquid comprises at least one of a polyethyleneglycol-modified silicone, a polypropyleneglycol-modified silicone, and a hydrocarbon oil.

28. The coating according to claim 17, wherein the lubricating liquid is present in the composition at a weight percent greater than about 30% of the total weight of the polysiloxane composition.

29. The coating according to claim 16, wherein the coating exhibits little or no leachate toxicity when measured according to ISO 10993-5 cytotoxicity test.

30. The coating according to claim 16, wherein the surface has foul-release and/or foul impeding ("anti-fouling") properties.

* * * * *